United States Patent
Tang et al.

(10) Patent No.: US 12,190,612 B2
(45) Date of Patent: Jan. 7, 2025

(54) VIDEO TEXT TRACKING METHOD AND ELECTRONIC DEVICE

(71) Applicant: HUAWEI TECHNOLOGIES CO., LTD., Guangdong (CN)

(72) Inventors: Qisen Tang, Johannesburg (CA); Hengzhi Yao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 332 days.

(21) Appl. No.: 17/800,347

(22) PCT Filed: Jan. 14, 2021

(86) PCT No.: PCT/CN2021/071796
§ 371 (c)(1),
(2) Date: Aug. 17, 2022

(87) PCT Pub. No.: WO2021/164479
PCT Pub. Date: Aug. 26, 2021

(65) Prior Publication Data
US 2023/0058296 A1    Feb. 23, 2023

(30) Foreign Application Priority Data
Feb. 21, 2020    (CN) .......................... 202010108338.4

(51) Int. Cl.
| | |
|---|---|
| *G06V 30/148* | (2022.01) |
| *G06F 7/24* | (2006.01) |
| *G06F 18/20* | (2023.01) |
| *G06F 18/213* | (2023.01) |
| *G06N 3/02* | (2006.01) |
| *G06V 10/24* | (2022.01) |
| *G06V 10/82* | (2022.01) |

(Continued)

(52) U.S. Cl.
CPC .............. *G06V 20/63* (2022.01); *G06V 10/24* (2022.01); *G06V 10/82* (2022.01); *G06V 30/1607* (2022.01)

(58) Field of Classification Search
CPC ........ G06V 20/63; G06V 10/24; G06V 10/82; G06V 30/1607
See application file for complete search history.

(56) References Cited

U.S. PATENT DOCUMENTS

| | | |
|---|---|---|
| 6,473,522 B1 | 10/2002 | Lienhart et al. |
| 6,937,766 B1 | 8/2005 | Wilf et al. |

(Continued)

FOREIGN PATENT DOCUMENTS

| | | |
|---|---|---|
| CN | 101276416 A | 10/2008 |
| CN | 101542466 A | 9/2009 |
| CN | 101791230 A | 8/2010 |

(Continued)

*Primary Examiner* — David F Dunphy
(74) *Attorney, Agent, or Firm* — WOMBLE BOND DICKINSON (US) LLP

(57) ABSTRACT

A video text tracking method and an electronic device are disclosed. In the method, a text line region is split into sub-regions, the sub-regions are tracked and then processed, and processed sub-regions are combined into a new text line. The technical solutions provided in this application are not only applicable to a straight-line text scenario or a curved text scenario, but also present a good tracking effect for a deformable text line.

19 Claims, 10 Drawing Sheets

(51) Int. Cl.
   *G06V 20/62*       (2022.01)
   *G06V 30/16*       (2022.01)

(56) References Cited

U.S. PATENT DOCUMENTS

2014/0112527 A1\* 4/2014 Nister .................. G06V 20/635
                                                    382/176
2019/0205638 A1\* 7/2019 Zhang .................... G06V 10/82

FOREIGN PATENT DOCUMENTS

| CN | 101833664 A | 9/2010 |
|----|-------------|--------|
| CN | 109800757 A | 5/2019 |
| CN | 110147724 A | 8/2019 |
| CN | 110276349 A | 9/2019 |
| CN | 110555433 A | 12/2019 |
| CN | 110633664 A | 12/2019 |
| CN | 110796130 A | 2/2020 |
| WO | 2020029306 A1 | 2/2020 |

\* cited by examiner

Adjust locations of frame points, so that sub-regions enclosed by the frame points totally enclose tracing points Perform smoothing processing on enclosing curves

VIDEO TEXT TRACKING METHOD AND ELECTRONIC DEVICE

CROSS-REFERENCE TO RELATED APPLICATIONS

This application is a National Stage of International Application No. PCT/CN2021/071796 filed on Jan. 14, 2021, which claims priority to Chinese Patent Application No. 202010108338.4, filed on Feb. 21, 2020, both of which are hereby incorporated by reference in their entireties.

TECHNICAL FIELD

This application relates to the optical character recognition (OCR) subfield in the artificial intelligence (AI) field, and in particular, to a video text tracking method and an electronic device.

BACKGROUND

A biggest difference between augmented reality (AR) translation and photo translation lies in: In the AR translation, there is no need to take a picture first and then recognize content of the picture, but a real-time translation effect is presented for text content in a camera, and accurate real-time translation can be provided at an original text location, as long as a user focuses the camera on to-be-translated content. An entire AR translation process is dynamic. Compared with the conventional photo translation, the AR translation has witnessed a leapfrog upgrade in experience, and is especially applied to scenarios such as tourism, international shopping, and foreign literature reading.

The entire AR translation process involves technologies such as OCR text detection and recognition, text tracking (tracing), machine translation, AR rendering, and translated text backfilling. Because it takes a long time to perform OCR (at a level of hundreds of milliseconds to seconds per video frame), when a lens of a mobile phone or a lens of a camera moves in an actual shooting scenario, a location of a text line cannot be obtained through OCR frame by frame. As a result, such a solution cannot meet a real-time requirement. Therefore, tracking a text previously recognized through OCR and predicting and providing a location of a text line are may be useful for presenting the translation effect in real time in an AR translation product. In addition, the AR translation technology may also be applied to a scenario such as automatic video subtitle translation and backfilling, to quickly complete subtitle translation for each frame in a video, and greatly save manpower.

Currently, as shown in FIG. 1, a location of each line of straight-line text is usually determined by using an inclined rectangle, to resolve a text line inclination problem caused by non-parallel between a text line frame and a viewfinder frame during framing. Currently, a commonly used technical solution is: First, OCR is performed on a first video frame obtained after a lens is stabilized, to detect and recognize a location of a text line and text content in the video frame. Second, a quantity of tracing points are determined in each text line region by using a key point detection technology, such as a corner detection technology. Then, corresponding locations of the tracing points are obtained in a next video frame by using a tracking method such as an optical flow tracking method, to calculate a projection transformation matrix (or a homography matrix) for each text line region between the two video frames. The projection matrix is applied to four vertices of an inclined rectangle of the text line region to obtain a location of the text line in the next frame, and then translated text is backfilled. The foregoing tracing process is repeated. When a ratio of quantities of tracing points at corresponding locations in two adjacent frames (relative to the first frame on which OCR is performed) is less than a threshold because a text line moves out of a viewfinder or a text line is blocked by another object, current tracking is considered to be failed; and after the lens is stabilized, OCR is performed again to start another tracking process. Application of this method makes it possible to track a location of the text line in the latest video frame and perform backfilling at the corresponding location, even if an inclination angle of the text line relative to that in viewfinding changes.

However, the conventional technology has disadvantages in resolving a problem of tracking a curved text. When the curved text is tracked, there is a large quantity of blanks outside a text region in an inclined rectangle used to frame a location of a text line. If IOU (intersection over union between an area of an actual text region and an area of a predicted text region) commonly used in target detection is used as a measurement indicator, although an intersection over union between the area of the actual text region and the area of the predicted region may not be small, a value of the measurement indicator is unsatisfied after normalization is performed by using a large predicted region. Such curved text is often found in scenarios such as a shop-sign shown in FIG. 2 and a video wordart narration or a video subtitle.

In addition, for a deformable text, for example, an outer package text of a bottling beverage, as shown in FIG. 3, a text "orientation" varies with a shooting angle, and a shape of an inclined rectangle also cannot reflect such a change Therefore, a location of a video text line cannot be accurately tracked and located when the curved text is tracked by using the conventional technology.

SUMMARY

This application provides a video text tracking method and an electronic device, which are different from the conventional technology in which a full text line is tracked. A text line region is split into sub-regions, the sub-regions are tracked, and then processed, and processed sub-regions are combined into a new text line. This is not only applicable to a straight-line text scenario (center points of texts are on a straight line) or a curved text scenario, but also presents a good tracking effect for a deformable text line. Therefore, a location of the text line can be accurately tracked and predicted.

According to a first aspect, this application provides a video text tracking method. The method includes: An electronic device performs OCR detection on a first video frame to obtain frame points that anchor a location of each text line, where the frame points include at least a first initial frame point set, the first initial frame point set includes frame points that are recognized through OCR and that are used to anchor a location of a first text line, the first text line is any text line in the first video frame, and a quantity of frame points in the first initial frame point set is not less than 4. The electronic device determines a first extended frame point set based on the first initial frame point set, where the first extended frame point set frames the first text line in N contiguous and equal-width sub-regions, and N is a positive integer not less than 2. The electronic device determines, in a second video frame, locations of frame points in the first extended frame point set based on locations of tracing points in a second tracing point set relative to locations of tracing points in a first tracing point set, to obtain a second calculated frame point set, where the first tracing point set includes the tracing points in the sub-regions determined based on the first extended frame point set in the first video frame, the second tracing point set includes the tracing points that are predicted in the second video frame and that are at locations corresponding to the locations of the tracing points in the first tracing point set, and the second video frame is a video frame obtained after the first video frame. The electronic device determines a second region based on the second calculated frame point set, where the second region is a location that is determined by the electronic device and at which the first text line is located in the second video frame.

According to the method provided in the first aspect, the electronic device splits each text line into N contiguous and equal-width sub-regions based on the frame points of each text line recognized through OCR, and then performs tracking processing on each equal-width sub-region to determine a location of each text line in the second video frame. The tracking processing is performed at a finer granularity and the contiguous sub-regions can present a straight line effect or a curved effect. The method is not only applicable to a straight-line text scenario (center points of texts are on a straight line) or a curved text scenario, but also presents a good tracking effect for a deformable text line. Therefore, the location of the text line can be accurately tracked and predicted.

With reference to the first aspect, in some embodiments, that the electronic device determines a second region based on the second calculated frame point set includes: The electronic device adjusts locations of frame points in the second calculated frame point set to obtain a second adjusted frame point set, so that sub-regions determined based on the second adjusted frame point set totally enclose the tracing points in the second tracing point set. The electronic device determines the second region based on the second adjusted frame point set.

Specifically, there are many adjustment manners.

For example, in some embodiments, the electronic device may uniformly adjust the locations of the frame points based on a highest tracing point and a lowest tracing point in the second tracing point set.

Vertical coordinates of frame points in a second calculated upper frame point set are adjusted to being greater than the vertical coordinate of the highest tracing point in the second tracing point set, and less than a sum of the vertical coordinate of the highest tracing point and preset parameter folds of a font height.

Vertical coordinates of frame points in a second calculated lower frame point set are adjusted to being less than the vertical coordinate of the lowest tracing point in the second tracing point set, and greater than a difference between the vertical coordinate of the lowest tracing point and the preset parameter folds of the font height.

For example, in some embodiments, the electronic device may adjust the locations of the frame points based on a highest tracing point and a lowest tracing point that fall within a range of preset distances to the frame points.

Vertical coordinates of frame points in a second calculated upper frame point set are adjusted to being greater than the vertical coordinate of the highest tracing point that falls within the range of the preset distances from the frame points, and less than a sum of the vertical coordinate of the highest tracing point and preset parameter folds of a font height.

Vertical coordinates of frame points in a second calculated lower frame point set are adjusted to being less than the vertical coordinate of the lowest tracing point that falls within the range of the preset distances from the frame points, and greater than a difference between the vertical coordinate of the lowest tracing point and the preset parameter folds of the font height.

There may also be another adjustment manner, provided that the sub-regions determined based on the second adjusted frame point set obtained through adjustment can totally enclose the tracing points in the second tracing point set. This is not limited herein.

In this embodiment of this application, after determining that the second calculated frame point set is tracked and determined in the second video frame, the electronic device may not directly use the second calculated frame point set, but first adjust the locations of the frame points in the second calculated frame point set, to obtain the second adjusted frame point set that can totally enclose the second tracing point set. Then, the electronic device uses the second adjusted frame point set to determine the second region in which the first text line is located in the second video frame. This further improves accuracy of predicting the location of the first text line in the second video frame. In addition, the second tracing points are totally enclosed, so that more tracing points can be used for prediction of locations in a subsequent video frame. This improves continuity of video text tracking.

With reference to the first aspect, in some embodiments, that the electronic device determines the second region based on the second adjusted frame point set includes: The electronic device performs smoothing processing on enclosing curves of the sub-regions determined based on the second adjusted frame point set, to obtain the second region.

Specifically, in some embodiments, the electronic device separately fits frame points in a second adjusted upper frame point set and frame points in a second adjusted lower frame point set, to obtain a smooth enclosing curve to form the second region, where the second adjusted frame point set may be classified into the second adjusted upper frame point set and the second adjusted lower frame point set, the second adjusted upper frame point set includes frame points located in the upper half of the sub-regions, and the second adjusted lower frame point set includes frame points located in the lower half of the sub-regions.

Further, in some embodiments, when separately fitting the frame points in the second adjusted upper frame point set and the frame points in the second adjusted lower frame point set, the electronic device may calculate a linear correlation coefficient of the frame points in the second adjusted upper frame point set and a linear correlation coefficient of the frame points in the second adjusted lower frame point set, and determine fitting manners based on values of the linear correlation coefficients.

For example, the electronic device may calculate a Pearson correlation coefficient of the frame points in the second adjusted upper frame point set and a Pearson correlation coefficient of the frame points in the second adjusted lower frame point set. If a linear correlation is relatively strong (for example, the correlation coefficient is greater than 0.8), the electronic device may determine to use linear fitting. If the linear correlation is relatively weak, the electronic device may determine to use higher-order fitting such as secondary fitting.

In this embodiment of this application, the electronic device fits the enclosing curves of the sub-regions determined based on the second adjusted frame point set, that is, performs smoothing processing on the enclosing curves, so that the sub-regions can keep contiguous and an enclosing curve of the text line keeps smooth, to prevent a sawtooth curve.

In some embodiments, in some embodiments, the electronic device may store an intermediate value for calculating the linear correlation coefficient (for example, an intermediate value for calculating the Pearson correlation coefficient), so that the stored intermediate value may be directly used when a related intermediate value is to be used in another subsequent calculation process, to reduce a calculation amount.

With reference to the first aspect, in some embodiments, that the electronic device determines a first extended frame point set based on the first initial frame point set includes: When the quantity of frame points in the first initial frame point set is equal to 4, the electronic device selects points at equal abscissa intervals on upper and lower sides of a rectangle determined based on the four frame points as new frame points, to form the first extended frame point set; or when the quantity of frame points in the first initial frame point set is greater than 4, the electronic device separately fits frame points in a first initial upper frame point set and frame points in a first initial lower frame point set, to obtain an upper fitting curve and a lower fitting curve, where the first initial upper frame point set includes frame points that are in the first initial frame point set and that are located in the upper half of the first text line, and the first initial lower frame point set includes frame points that are in the first initial frame point set and that are located in the lower half of the first text line; and the electronic device selects points at equal abscissa intervals on the upper fitting curve and the lower fitting curve as new frame points, to form the first extended frame point set.

In this embodiment of this application, based on different quantities of frame points, the electronic device may perform different processing to select points at equal abscissa intervals as new frame points to form the first extended frame point set, so that video text tracking can well support both a straight-line text and a curved text.

With reference to the first aspect, in some embodiments, the method further includes: The electronic device determines, in a third video frame, locations of frame points in a third adjusted frame point set based on locations of tracing points in a third tracing point set relative to the locations of the tracing points in the second tracing point set, to obtain a third calculated frame point set, where the third tracing point set includes the tracing points that are predicted in the third video frame and that are at locations corresponding to the locations of the tracing points in the second tracing point set, and the third video frame is a video frame obtained after the second video frame. The electronic device adjusts locations of frame points in the third calculated frame point set to obtain the third adjusted frame point set, so that sub-regions determined based on the third adjusted frame point set totally enclose the tracing points in the third tracing point set. The electronic device performs smoothing processing on enclosing curves of the sub-regions determined based on the third adjusted frame point set, to obtain a third region, where the third region is a location that is determined by the electronic device and at which the first text line is located in the third video frame.

It may be understood that, according to the method, a location of the first text line in a subsequent video frame, such as a fourth video frame, a fifth video frame, or a sixth video frame, can be tracked and determined in a similar manner.

In this embodiment of this application, the video frame on which OCR is performed is the first video frame, a next video frame that is to be processed after the first video frame is the second video frame, and a next video frame that is to be processed after the second video frame is the third video frame. The frame points and the tracing points in the first video frame are determined through OCR, and frame points and tracing points determined in a previous video frame may be used in a subsequent video frame processing process. When a ratio of quantities of tracing points at corresponding locations found in two adjacent processed frames is less than a tracing point ratio threshold, tracking is considered to be failed, another tracing procedure is started, and a first video frame is re-determined. This ensures continuous and efficient operation of the video text method.

With reference to the first aspect, in some embodiments, the method further includes: The electronic device maintains a buffer of a fixed length of a preset quantity of video frames starting from the first video frame, where the buffer is used to store a video frame newly generated before a result of the first video frame recognized through OCR is returned.

Specifically, in some embodiments, there may be many different maintenance manners to maintain the buffer of the fixed-length.

For example, when a quantity of video frames stored in the buffer is equal to the preset quantity of frames, the electronic device deletes a stored video frame from the buffer each time a new video frame is added, where a difference between time for fetching adjacent video frames stored in the buffer is less than a preset interval.

For example, when a quantity of video frames stored in the buffer is equal to the preset quantity of frames, the electronic device deletes a stored video frame from the buffer each time a new video frame is added, so that intervals between adjacent frames remaining in the buffer keep as equal as possible.

In this embodiment of this application, a purpose of maintaining the buffer of the fixed-length is to avoid a case in which OCR recognition is performed for a long time because there are a relatively large quantity of contexts in the first video frame, and limiting a buffer size can shorten time, so that the latest video frame is "caught up". This shortens time for a user to wait for a to-be-returned result is shortened, and improves experience.

According to a second aspect, an embodiment of this application provides an electronic device. The electronic device includes one or more processors and a memory. The memory is coupled to the one or more processors, the memory is configured to store computer program code, the computer program code includes computer instructions, and the one or more processors invoke the computer instructions, so that the electronic device performs the following operations: performing OCR detection on a first video frame to obtain frame points that anchor a location of each text line, where the frame points include at least a first initial frame point set, the first initial frame point set includes frame points that are recognized through OCR and that are used to anchor a location of a first text line, the first text line is any text line in the first video frame, and a quantity of frame points in the first initial frame point set is not less than 4; determining a first extended frame point set based on the first initial frame point set, where the first extended frame point set frames the first text line in N contiguous and equal-width sub-regions, and N is a positive integer not less than 2; determining, in a second video frame, locations of frame points in the first extended frame point set based on locations of tracing points in a second tracing point set relative to locations of tracing points in a first tracing point set, to obtain a second calculated frame point set, where the first tracing point set includes the tracing points in the sub-regions determined based on the first extended frame point set in the first video frame, the second tracing point set includes the tracing points that are predicted in the second video frame and that are at locations corresponding to the locations of the tracing points in the first tracing point set, and the second video frame is a video frame obtained after the first video frame; and determining a second region based on the second calculated frame point set, where the second region is a determined location at which the first text line is located in the second video frame.

According to the electronic device provided in the second aspect, the electronic device splits each text line into N contiguous and equal-width sub-regions based on the frame points of each text line recognized through OCR, and then performs tracking processing on each equal-width sub-region to determine a location of each text line in the second video frame. The tracking processing is performed at a finer granularity and the contiguous sub-regions can present a straight line effect or a curved effect. The method is not only applicable to a straight-line scenario (center points of texts are on a straight line) or a curved text scenario, but also presents a good tracking effect for a deformable text line. Therefore, the location of the text line can be accurately tracked and predicted.

With reference to the second aspect, in some embodiments, the one or more processors are configured to invoke the computer instructions, so that the electronic device performs the following operations: adjusting locations of frame points in the second calculated frame point set to obtain a second adjusted frame point set, so that sub-regions determined based on the second adjusted frame point set totally enclose the tracing points in the second tracing point set; and determining the second region based on the second adjusted frame point set.

Specifically, there are many adjustment manners.

For example, in some embodiments, the electronic device may uniformly adjust the locations of the frame points based on a highest tracing point and a lowest tracing point in the second tracing point set.

Vertical coordinates of frame points in a second calculated upper frame point set are adjusted to being greater than the vertical coordinate of the highest tracing point in the second tracing point set, and less than a sum of the vertical coordinate of the highest tracing point and preset parameter folds of a font height.

Vertical coordinates of frame points in a second calculated lower frame point set are adjusted to being less than the vertical coordinate of the lowest tracing point in the second tracing point set, and greater than a difference between the vertical coordinate of the lowest tracing point and the preset parameter folds of the font height.

For example, in some embodiments, the electronic device may adjust the locations of the frame points based on a highest tracing point and a lowest tracing point that fall within a range of preset distances to the frame points.

Vertical coordinates of frame points in a second calculated upper frame point set are adjusted to being greater than the vertical coordinate of the highest tracing point that falls within the range of the preset distances from the frame points, and less than a sum of the vertical coordinate of the highest tracing point and preset parameter folds of a font height.

Vertical coordinates of frame points in a second calculated lower frame point set are adjusted to being less than the vertical coordinate of the lowest tracing point that falls within the range of the preset distances from the frame points, and greater than a difference between the vertical coordinate of the lowest tracing point and the preset parameter folds of the font height.

There may also be another adjustment manner, provided that the sub-regions determined based on the second adjusted frame point set obtained through adjustment can totally enclose the tracing points in the second tracing point set. This is not limited herein.

With reference to the second aspect, in some embodiments, the one or more processors are configured to invoke the computer instructions, so that the electronic device performs the following operations: performing smoothing processing on enclosing curves of the sub-regions determined based on the second adjusted frame point set, to obtain the second region.

Specifically, in some embodiments, the electronic device separately fits frame points in a second adjusted upper frame point set and frame points in a second adjusted lower frame point set, to obtain a smooth enclosing curve to form the second region, where the second adjusted frame point set may be classified into the second adjusted upper frame point set and the second adjusted lower frame point set, the second adjusted upper frame point set includes frame points located in the upper half of the sub-regions, and the second adjusted lower frame point set includes frame points located in the lower half of the sub-regions.

Further, in some embodiments, when separately fitting the frame points in the second adjusted upper frame point set and the frame points in the second adjusted lower frame point set, the electronic device may calculate a linear correlation coefficient of the frame points in the second adjusted upper frame point set and a linear correlation coefficient of the frame points in the second adjusted lower frame point set, and determine fitting manners based on values of the linear correlation coefficients.

For example, the electronic device may calculate a Pearson correlation coefficient of the frame points in the second adjusted upper frame point set and a Pearson correlation coefficient of the frame points in the second adjusted lower frame point set. If a linear correlation is relatively strong (for example, the correlation coefficient is greater than 0.8), the electronic device may determine to use linear fitting. If the linear correlation is relatively weak, the electronic device may determine to use higher-order fitting such as secondary fitting.

In some embodiments, in some embodiments, the electronic device may store an intermediate value for calculating the linear correlation coefficient (for example, an intermediate value for calculating the Pearson correlation coefficient), so that the stored intermediate value may be directly used when a related intermediate value is to be used in another subsequent calculation process to reduce a calculation amount.

With reference to the second aspect, in some embodiments, the one or more processors are configured to invoke the computer instructions, so that the electronic device performs the following operations: when the quantity of frame points in the first initial frame point set is equal to 4, selecting points at equal abscissa intervals on upper and lower sides of a rectangle determined based on the four frame points as new frame points, to form the first extended frame point set; or when the quantity of frame points in the first initial frame point set is greater than 4, separately fitting frame points in a first initial upper frame point set and frame points in a first initial lower frame point set, to obtain an upper fitting curve and a lower fitting curve, where the first initial upper frame point set includes frame points that are in the first initial frame point set and that are located in the upper half of the first text line, and the first initial lower frame point set includes frame points that are in the first initial frame point set and that are located in the lower half of the first text line; and selecting points at equal abscissa intervals on the upper fitting curve and the lower fitting curve as new frame points, to form the first extended frame point set.

With reference to the second aspect, in some embodiments, the one or more processors are further configured to invoke the computer instructions, so that the electronic device performs the following operations: determining, in a third video frame, locations of frame points in a third adjusted frame point set based on locations of tracing points in a third tracing point set relative to the locations of the tracing points in the second tracing point set, to obtain a third calculated frame point set, where the third tracing point set includes the tracing points that are predicted in the third video frame and that are at locations corresponding to the locations of the tracing points in the second tracing point set, and the third video frame is a video frame obtained after the second video frame; adjusting locations of frame points in the third calculated frame point set to obtain the third adjusted frame point set, so that sub-regions determined based on the third adjusted frame point set totally enclose the tracing points in the third tracing point set; and performing smoothing processing on enclosing curves of the sub-regions determined based on the third adjusted frame point set, to obtain a third region, where the third region is a determined location at which the first text line is located in the third video frame.

It may be understood that, the electronic device can track and determine a location of the first text line in a subsequent video frame, such as a fourth video frame, a fifth video frame, or a sixth video frame in a similar manner.

With reference to the second aspect, in some embodiments, the one or more processors are further configured to invoke the computer instructions, so that the electronic device performs the following operations: maintaining a buffer of a fixed length of a preset quantity of video frames starting from the first video frame, where the buffer is used to store a video frame newly generated before a result of the first video frame recognized through OCR is returned.

Specifically, in some embodiments, there may be many different maintenance manners to maintain the buffer of the fixed-length.

For example, when a quantity of video frames stored in the buffer is equal to the preset quantity of frames, the electronic device deletes a stored video frame from the buffer each time a new video frame is added, where a difference between time for fetching adjacent video frames stored in the buffer is less than a preset interval.

For example, when a quantity of video frames stored in the buffer is equal to the preset quantity of frames, the electronic device deletes a stored video frame from the buffer each time a new video frame is added, so that intervals between adjacent frames remaining in the buffer keep as equal as possible.

According to a third aspect, an embodiment of this application provides an electronic device. The electronic device includes:

an OCR detection module, configured to perform OCR detection on a first video frame to obtain frame points that anchor a location of each text line, where the frame points include at least a first initial frame point set, the first initial frame point set includes frame points that are recognized through OCR and that are used to anchor a location of a first text line, the first text line is any text line in the first video frame, and a quantity of frame points in the first initial frame point set is not less than 4;

a frame point extension module, configured to determine a first extended frame point set based on the first initial frame point set, where the first extended frame point set frames the first text line in N contiguous and equal-width sub-regions, and N is a positive integer not less than 2;

a frame point calculation module, configured to determine, in the second video frame, locations of the frame points in the first extended frame point set based on locations of tracing points in a second tracing point set relative to locations of tracing points in a first tracing point set, to obtain a second calculated frame point set, where the first tracing point set includes tracing points in the sub-regions determined based on the first extended frame point set in the first video frame, the second tracing point set includes tracing points that are predicted in the second video frame and that are at locations corresponding to the locations of the tracing point in the first tracing point set, and the second video frame is a video frame obtained after the first video frame; and a region determining module, configured to determine a second region based on the second calculated frame point set, where the second region is a determined location at which the first text line is located in the second video frame.

With reference to the third aspect, in some embodiments, the region determining module includes:

a frame point adjustment unit, configured to adjust locations of frame points in the second calculated frame point set to obtain a second adjusted frame point set, so that sub-regions determined based on the second adjusted frame point set totally enclose the tracing points in the second tracing point set; and a region determining unit, configured to determine the second region based on the second adjusted frame point set.

Specifically, there are many adjustment manners.

For example, in some embodiments, the frame point adjustment unit may uniformly adjust the locations of the frame points based on a highest tracing point and a lowest tracing point in the second tracing point set; adjust vertical coordinates of frame points in a second calculated upper frame point set to being greater than the vertical coordinate of the highest tracing point in the second tracing point set, and less than a sum of the vertical coordinate of the highest tracing point and preset parameter folds of a font height; and adjust vertical coordinates of frame points in a second calculated lower frame point set to being less than the vertical coordinate of the lowest tracing point in the second tracing point set, and greater than a difference between the vertical coordinate of the lowest tracing point and the preset parameter folds of the font height.

For example, in some embodiments, the frame point adjustment unit may adjust the locations of the frame points based on a highest tracing point and a lowest tracing point that fall within a range of preset distances to the frame points; adjust vertical coordinates of frame points in a second calculated upper frame point set to being greater than the vertical coordinate of the highest tracing point that falls within the range of the preset distances from the frame points, and less than a sum of the vertical coordinate of the highest tracing point and preset parameter folds of a font height; and adjust vertical coordinates of frame points in a second calculated lower frame point set to being less than the vertical coordinate of the lowest tracing point that falls within the range of the preset distances from the frame points, and greater than a difference between the vertical coordinate of the lowest tracing point and the preset parameter folds of the font height.

There may also be another adjustment manner, provided that the sub-regions determined based on the second adjusted frame point set obtained through adjustment can totally enclose the tracing points in the second tracing point set. This is not limited herein.

With reference to the third aspect, in some embodiments, the region determining unit is configured to perform smoothing processing on enclosing curves of the sub-regions determined based on the second adjusted frame point set, to obtain the second region.

Specifically, in some embodiments, the region determining unit separately fits frame points in a second adjusted upper frame point set and frame points in a second adjusted lower frame point set, to obtain a smooth enclosing curve to form the second region, where the second adjusted frame point set may be classified into the second adjusted upper frame point set and the second adjusted lower frame point set, the second adjusted upper frame point set includes frame points located in the upper half of the sub-regions, and the second adjusted lower frame point set includes frame points located in the lower half of the sub-regions.

Further, in some embodiments, when fitting the frame points in the second adjusted upper frame point set and the frame points in the second adjusted lower frame point set, the region determining unit may calculate a linear correlation coefficient of the frame points in the second adjusted upper frame point set and a linear correlation coefficient of the frame points in the second adjusted lower frame point set, and determine fitting manners based on values of the linear correlation coefficients.

For example, the region determining unit may calculate a Pearson correlation coefficient of the frame points in the second adjusted upper frame point set and a Pearson correlation coefficient of the frame points in the second adjusted lower frame point set. If a linear correlation is relatively strong (for example, the correlation coefficient is greater than 0.8), the region determining unit may determine to use linear fitting. If the linear correlation is relatively weak, the region determining unit may determine to use higher-order fitting such as secondary fitting.

In some embodiments, in some embodiments, the electronic device may further include an intermediate value storage module, configured to store an intermediate value for calculating the linear correlation coefficient (for example, an intermediate value for calculating the Pearson correlation coefficient), so that the stored intermediate value may be directly used when a related intermediate value is to be used in another subsequent calculation process to reduce a calculation amount.

With reference to the third aspect, in some embodiments, the frame point extension module includes:
a straight-line text frame point extension unit, configured to: when the quantity of frame points in the first initial frame point set is equal to 4, select points at equal frame point abscissa intervals on upper and lower sides of a rectangle determined based on the four frame points as new frame points, to form the first extended frame point set; or
a curved text frame point extension unit, configured to: when the quantity of frame points in the first initial frame point set is greater than 4, separately fit frame points in a first initial upper frame point set and frame points in a first initial lower frame point set, to obtain an upper fitting curve and a lower fitting curve, where the first initial upper frame point set includes frame points that are in the first initial frame point set and that are located in the upper half of the first text line, and the first initial lower frame point set includes frame points that are in the first initial frame point set and that are located in the lower half of the first text line; and select points at equal abscissa intervals on the upper fitting curve and the lower fitting curve as new frame points, to form the first extended frame point set.

With reference to the third aspect, in some embodiments, the electronic device may further include:
a frame point tracking and calculation module, configured to determine, in the third video frame, locations of frame points in the third adjusted frame point set based on locations of tracing points in the third tracing point set relative to the locations of the tracing points in the second tracing point set, to obtain a third calculated frame point set, where the third tracing point set includes tracing points that are predicted in the third video frame and that are at locations corresponding to the locations of the tracing points in the second tracing point set, and the third video frame is a video frame obtained after the second video frame;
a frame point tracking and adjustment module, configured to adjust locations of frame points in the third calculated frame point set to obtain the third adjusted frame point set, so that sub-regions determined based on the third adjusted frame point set totally enclose the tracing points in the third tracing point set; and
a tracking region determining module, configured to perform smoothing processing on enclosing curves of the sub-regions determined based on the third adjusted frame point set, to obtain a third region, where the third region is a determined location at which the first text line is located in the third video frame.

It may be understood that the frame point tracking and calculation module, the frame point tracking and adjustment module, and the tracking region determining module can track and determine a location of the first text line in a subsequent video frame, such as a fourth video frame, a fifth video frame, or a sixth video frame in a similar manner.

With reference to the third aspect, in some embodiments, the electronic device may further include:
a buffer maintaining module, configured to maintain a buffer of a fixed length of a preset quantity of video frames starting from the first video frame, where the buffer is used to store a video frame newly generated before a result of the first video frame recognized through OCR is returned).

Specifically, in some embodiments, there may be many different maintenance manners to maintain the buffer of the fixed-length.

For example, when a quantity of video frames stored in the buffer is equal to the preset quantity of frames, the buffer maintaining module deletes a stored video frame from the buffer each time a new video frame is added, where a difference between time for fetching adjacent video frames stored in the buffer is less than a preset interval.

For example, when a quantity of video frames stored in the buffer is equal to the preset quantity of frames, the buffer maintaining module deletes a stored video frame from the buffer each time a new video frame is added, so that intervals between adjacent frames remaining in the buffer keep as equal as possible.

According to a fourth aspect, an embodiment of this application provides a chip. The chip is applied to an electronic device, and the chip includes one or more processors. The processor is configured to invoke computer instructions, so that the electronic device performs the following operations: performing OCR detection on a first video frame to obtain frame points that anchor a location of each text line, where the frame points include at least a first initial frame point set, the first initial frame point set includes frame points that are recognized through OCR and that are used to anchor a location of a first text line, the first text line is any text line in the first video frame, and a quantity of frame points in the first initial frame point set is not less than 4; determining a first extended frame point set based on the first initial frame point set, where the first extended frame point set frames the first text line in N contiguous and equal-width sub-regions, and N is a positive integer not less than 2; determining, in a second video frame, locations of frame points in the first extended frame point set based on locations of tracing points in a second tracing point set relative to locations of tracing points in a first tracing point set, to obtain a second calculated frame point set, where the first tracing point set includes the tracing points in the sub-regions determined based on the first extended frame point set in the first video frame, the second tracing point set includes the tracing points that are predicted in the second video frame and that are at locations corresponding to the locations of the tracing points in the first tracing point set, and the second video frame is a video frame obtained after the first video frame; and determining a second region based on the second calculated frame point set, where the second region is a determined location at which the first text line is located in the second video frame.

With reference to the fourth aspect, in some embodiments, the one or more processors are configured to invoke the computer instructions, so that the electronic device performs the following operations: adjusting locations of frame points in the second calculated frame point set to obtain a second adjusted frame point set, so that sub-regions determined based on the second adjusted frame point set totally enclose the tracing points in the second tracing point set; and determining the second region based on the second adjusted frame point set.

Specifically, there are many adjustment manners.

For example, in some embodiments, the electronic device may uniformly adjust the locations of the frame points based on a highest tracing point and a lowest tracing point in the second tracing point set.

Vertical coordinates of frame points in a second calculated upper frame point set are adjusted to being greater than the vertical coordinate of the highest tracing point in the second tracing point set, and less than a sum of the vertical coordinate of the highest tracing point and preset parameter folds of a font height.

Vertical coordinates of frame points in a second calculated lower frame point set are adjusted to being less than the vertical coordinate of the lowest tracing point in the second tracing point set, and greater than a difference between the vertical coordinate of the lowest tracing point and the preset parameter folds of the font height.

For example, in some embodiments, the electronic device may adjust the locations of the frame points based on a highest tracing point and a lowest tracing point that fall within a range of preset distances to the frame points.

Vertical coordinates of frame points in a second calculated upper frame point set are adjusted to being greater than the vertical coordinate of the highest tracing point that falls within the range of the preset distances from the frame points, and less than a sum of the vertical coordinate of the highest tracing point and preset parameter folds of a font height.

Vertical coordinates of frame points in a second calculated lower frame point set are adjusted to being less than the vertical coordinate of the lowest tracing point that falls within the range of the preset distances from the frame points, and greater than a difference between the vertical coordinate of the lowest tracing point and the preset parameter folds of the font height.

There may also be another adjustment manner, provided that the sub-regions determined based on the second adjusted frame point set obtained through adjustment can totally enclose the tracing points in the second tracing point set. This is not limited herein.

With reference to the fourth aspect, in some embodiments, the one or more processors are configured to invoke the computer instructions, so that the electronic device performs the following operations: performing smoothing processing on enclosing curves of the sub-regions determined based on the second adjusted frame point set, to obtain the second region.

Specifically, in some embodiments, the electronic device separately fits frame points in a second adjusted upper frame point set and frame points in a second adjusted lower frame point set, to obtain a smooth enclosing curve to form the second region, where the second adjusted frame point set may be classified into the second adjusted upper frame point set and the second adjusted lower frame point set, the second adjusted upper frame point set includes frame points located in the upper half of the sub-regions, and the second adjusted lower frame point set includes frame points located in the lower half of the sub-regions.

Further, in some embodiments, when separately fitting the frame points in the second adjusted upper frame point set and the frame points in the second adjusted lower frame point set, the electronic device may calculate a linear correlation coefficient of the frame points in the second adjusted upper frame point set and a linear correlation coefficient of the frame points in the second adjusted lower frame point set, and determine fitting manners based on values of the linear correlation coefficients.

For example, the electronic device may calculate a Pearson correlation coefficient of the frame points in the second adjusted upper frame point set and a Pearson correlation coefficient of the frame points in the second adjusted lower frame point set. If a linear correlation is relatively strong (for example, the correlation coefficient is greater than 0.8), the electronic device may determine to use linear fitting. If the linear correlation is relatively weak, the electronic device may determine to use higher-order fitting such as secondary fitting.

In some embodiments, in some embodiments, the electronic device may store an intermediate value for calculating the linear correlation coefficient (for example, an intermediate value for calculating the Pearson correlation coefficient), so that the stored intermediate value may be directly used when a related intermediate value is to be used in another subsequent calculation process to reduce a calculation amount.

With reference to the fourth aspect, in some embodiments, the one or more processors are configured to invoke the computer instructions, so that the electronic device performs the following operations: when the quantity of frame points in the first initial frame point set is equal to 4, selecting points at equal abscissa intervals on upper and lower sides of a rectangle determined based on the four frame points as new frame points, to form the first extended frame point set; or when the quantity of frame points in the first initial frame point set is greater than 4, separately fitting frame points in a first initial upper frame point set and frame points in a first initial lower frame point set, to obtain an upper fitting curve and a lower fitting curve, where the first initial upper frame point set includes frame points that are in the first initial frame point set and that are located in the upper half of the first text line, and the first initial lower frame point set includes frame points that are in the first initial frame point set and that are located in the lower half of the first text line; and selecting points at equal abscissa intervals on the upper fitting curve and the lower fitting curve as new frame points, to form the first extended frame point set.

With reference to the fourth aspect, in some embodiments, the one or more processors are further configured to invoke the computer instructions, so that the electronic device performs the following operations: determining, in a third video frame, locations of frame points in a third adjusted frame point set based on locations of tracing points in a third tracing point set relative to the locations of the tracing points in the second tracing point set, to obtain a third calculated frame point set, where the third tracing point set includes the tracing points that are predicted in the third video frame and that are at locations corresponding to the locations of the tracing points in the second tracing point set, and the third video frame is a video frame obtained after the second video frame; adjusting locations of frame points in the third calculated frame point set to obtain the third adjusted frame point set, so that sub-regions determined based on the third adjusted frame point set totally enclose the tracing points in the third tracing point set; and performing smoothing processing on enclosing curves of the sub-regions determined based on the third adjusted frame point set, to obtain a third region, where the third region is a determined location at which the first text line is located in the third video frame.

It may be understood that, the electronic device can track and determine a location of the first text line in a subsequent video frame, such as a fourth video frame, a fifth video frame, or a sixth video frame in a similar manner.

With reference to the fourth aspect, in some embodiments, the one or more processors are further configured to invoke the computer instructions, so that the electronic device performs the following operations: maintaining a buffer of a fixed length of a preset quantity of video frames starting from the first video frame, where the buffer is used to store a video frame newly generated before a result of the first video frame recognized through OCR is returned.

Specifically, in some embodiments, there may be many different maintenance manners to maintain the buffer of the fixed-length.

For example, when a quantity of video frames stored in the buffer is equal to the preset quantity of frames, the electronic device deletes a stored video frame from the buffer each time a new video frame is added, where a difference between time for fetching adjacent video frames stored in the buffer is less than a preset interval.

For example, when a quantity of video frames stored in the buffer is equal to the preset quantity of frames, the electronic device deletes a stored video frame from the buffer each time a new video frame is added, so that intervals between adjacent frames remaining in the buffer keep as equal as possible.

According to a fifth aspect, an embodiment of this application provides a computer program product including instructions. When the computer program product runs on an electronic device, the electronic device is enabled to perform the following operations: performing OCR detection on a first video frame to obtain frame points that anchor a location of each text line, where the frame points include at least a first initial frame point set, the first initial frame point set includes frame points that are recognized through OCR and that are used to anchor a location of a first text line, the first text line is any text line in the first video frame, and a quantity of frame points in the first initial frame point set is not less than 4; determining a first extended frame point set based on the first initial frame point set, where the first extended frame point set frames the first text line in N contiguous and equal-width sub-regions, and N is a positive integer not less than 2; determining, in a second video frame, locations of frame points in the first extended frame point set based on locations of tracing points in a second tracing point set relative to locations of tracing points in a first tracing point set, to obtain a second calculated frame point set, where the first tracing point set includes the tracing points in the sub-regions determined based on the first extended frame point set in the first video frame, the second tracing point set includes the tracing points that are predicted in the second video frame and that are at locations corresponding to the locations of the tracing points in the first tracing point set, and the second video frame is a video frame obtained after the first video frame; and determining a second region based on the second calculated frame point set, where the second region is a determined location at which the first text line is located in the second video frame.

With reference to the fifth aspect, in some embodiments, when the computer program product runs on the electronic device, the electronic device is enabled to perform the following operations: adjusting locations of frame points in the second calculated frame point set to obtain a second adjusted frame point set, so that sub-regions determined based on the second adjusted frame point set totally enclose the tracing points in the second tracing point set; and determining the second region based on the second adjusted frame point set.

Specifically, there are many adjustment manners.

For example, in some embodiments, the electronic device may uniformly adjust the locations of the frame points based on a highest tracing point and a lowest tracing point in the second tracing point set.

Vertical coordinates of frame points in a second calculated upper frame point set are adjusted to being greater than the vertical coordinate of the highest tracing point t in the second tracing point set, and less than a sum of the vertical coordinate of the highest tracing point and preset parameter folds of a font height.

Vertical coordinates of frame points in a second calculated lower frame point set are adjusted to being less than the vertical coordinate of the lowest tracing point in the second tracing point set, and greater than a difference between the vertical coordinate of the lowest tracing point and the preset parameter folds of the font height.

For example, in some embodiments, the electronic device may adjust the locations of the frame points based on a highest tracing point and a lowest tracing point that fall within a range of preset distances to the frame points.

Vertical coordinates of frame points in a second calculated upper frame point set are adjusted to being greater than the vertical coordinate of the highest tracing point that falls within the range of the preset distances from the frame points, and less than a sum of the vertical coordinate of the highest tracing point and preset parameter folds of a font height.

Vertical coordinates of frame points in a second calculated lower frame point set are adjusted to being less than the vertical coordinate of the lowest tracing point that falls within the range of the preset distances from the frame points, and greater than a difference between the vertical coordinate of the lowest tracing point and the preset parameter folds of the font height.

There may also be another adjustment manner, provided that the sub-regions determined based on the second adjusted frame point set obtained through adjustment can totally enclose the tracing points in the second tracing point set. This is not limited herein.

With reference to the fifth aspect, in some embodiments, when the computer program product runs on the electronic device, the electronic device is enabled to perform the following operations: performing smoothing processing on enclosing curves of the sub-regions determined based on the second adjusted frame point set, to obtain the second region.

Specifically, in some embodiments, the electronic device separately fits frame points in a second adjusted upper frame point set and frame points in a second adjusted lower frame point set, to obtain a smooth enclosing curve to form the second region, where the second adjusted frame point set may be classified into the second adjusted upper frame point set and the second adjusted lower frame point set, the second adjusted upper frame point set includes frame points located in the upper half of the sub-regions, and the second adjusted lower frame point set includes frame points located in the lower half of the sub-regions.

Further, in some embodiments, when separately fitting the frame points in the second adjusted upper frame point set and the frame points in the second adjusted lower frame point set, the electronic device may calculate a linear correlation coefficient of the frame points in the second adjusted upper frame point set and a linear correlation coefficient of the frame points in the second adjusted lower frame point set, and determine fitting manners based on values of the linear correlation coefficients.

For example, the electronic device may calculate a Pearson correlation coefficient of the frame points in the second adjusted upper frame point set and a Pearson correlation coefficient of the frame points in the second adjusted lower frame point set. If a linear correlation is relatively strong (for example, the correlation coefficient is greater than 0.8), the electronic device may determine to use linear fitting. If the linear correlation is relatively weak, the electronic device may determine to use higher-order fitting such as secondary fitting.

In some embodiments, in some embodiments, when the computer program product runs on the electronic device, the electronic device is enabled to store an intermediate value for calculating the linear correlation coefficient (for example, an intermediate value for calculating the Pearson correlation coefficient), so that the stored intermediate value may be directly used when a related intermediate value is to be used in another subsequent calculation process to reduce a calculation amount.

With reference to the fifth aspect, in some embodiments, when the computer program product runs on the electronic device, the electronic device is enabled to perform the following operations: when the quantity of frame points in the first initial frame point set is equal to 4, selecting points at equal abscissa intervals on upper and lower sides of a rectangle determined based on the four frame points as new frame points, to form the first extended frame point set; or when the quantity of frame points in the first initial frame point set is greater than 4, separately fitting frame points in a first initial upper frame point set and frame points in a first initial lower frame point set, to obtain an upper fitting curve and a lower fitting curve, where the first initial upper frame point set includes frame points that are in the first initial frame point set and that are located in the upper half of the first text line, and the first initial lower frame point set includes frame points that are in the first initial frame point set and that are located in the lower half of the first text line; and selecting points at equal abscissa intervals on the upper fitting curve and the lower fitting curve as new frame points, to form the first extended frame point set.

With reference to the fifth aspect, in some embodiments, when the computer program product runs on the electronic device, the electronic device is further enabled to perform the following operations: determining, in a third video frame, locations of frame points in a third adjusted frame point set based on locations of tracing points in a third tracing point set relative to the locations of the tracing points in the second tracing point set, to obtain a third calculated frame point set, where the third tracing point set includes the tracing points that are predicted in the third video frame and that are at locations corresponding to the locations of the tracing points in the second tracing point set, and the third video frame is a video frame obtained after the second video frame; adjusting locations of frame points in the third calculated frame point set to obtain the third adjusted frame point set, so that sub-regions determined based on the third adjusted frame point set totally enclose the tracing points in the third tracing point set; and performing smoothing processing on enclosing curves of the sub-regions determined based on the third adjusted frame point set, to obtain a third region, where the third region is a determined location at which the first text line is located in the third video frame.

It may be understood that, the electronic device can track and determine a location of the first text line in a subsequent video frame, such as a fourth video frame, a fifth video frame, or a sixth video frame in a similar manner.

With reference to the fifth aspect, in some embodiments, when the computer program product runs on the electronic device, the electronic device is further enabled to perform the following operations: maintaining a buffer of a fixed length of a preset quantity of video frames starting from the first video frame, where the buffer is used to store a video frame newly generated before a result of the first video frame recognized through OCR is returned.

Specifically, in some embodiments, there may be many different maintenance manners to maintain the buffer of the fixed-length.

For example, when a quantity of video frames stored in the buffer is equal to the preset quantity of frames, the electronic device deletes a stored video frame from the buffer each time a new video frame is added, where a difference between time for fetching adjacent video frames stored in the buffer is less than a preset interval.

For example, when a quantity of video frames stored in the buffer is equal to the preset quantity of frames, the electronic device deletes a stored video frame from the buffer each time a new video frame is added, so that intervals between adjacent frames remaining in the buffer keep as equal as possible.

According to a sixth aspect, an embodiment of this application provides a computer-readable storage medium, including instructions. When the instructions are run on an electronic device, the electronic device is enabled to perform the following operations: performing OCR detection on a first video frame to obtain frame points that anchor a location of each text line, where the frame points include at least a first initial frame point set, the first initial frame point set includes frame points that are recognized through OCR and that are used to anchor a location of a first text line, the first text line is any text line in the first video frame, and a quantity of frame points in the first initial frame point set is not less than 4; determining a first extended frame point set based on the first initial frame point set, where the first extended frame point set frames the first text line in N contiguous and equal-width sub-regions, and N is a positive integer not less than 2; determining, in a second video frame, locations of frame points in the first extended frame point set based on locations of tracing points in a second tracing point set relative to locations of tracing points in a first tracing point set, to obtain a second calculated frame point set, where the first tracing point set includes the tracing points in the sub-regions determined based on the first extended frame point set in the first video frame, the second tracing point set includes the tracing points that are predicted in the second video frame and that are at locations corresponding to the locations of the tracing points in the first tracing point set, and the second video frame is a video frame obtained after the first video frame; and determining a second region based on the second calculated frame point set, where the second region is a determined location at which the first text line is located in the second video frame.

With reference to the sixth aspect, in some embodiments, when the instructions are run on the electronic device, the electronic device is enabled to perform the following operations: adjusting locations of frame points in the second calculated frame point set to obtain a second adjusted frame point set, so that sub-regions determined based on the second adjusted frame point set totally enclose the tracing points in the second tracing point set; and determining the second region based on the second adjusted frame point set.

Specifically, there are many adjustment manners.

For example, in some embodiments, the electronic device may uniformly adjust the locations of the frame points based on a highest tracing point and a lowest tracing point in the second tracing point set.

Vertical coordinates of frame points in a second calculated upper frame point set are adjusted to being greater than the vertical coordinate of the highest tracing point in the second tracing point set, and less than a sum of the vertical coordinate of the highest tracing point and preset parameter folds of a font height.

Vertical coordinates of frame points in a second calculated lower frame point set are adjusted to being less than the vertical coordinate of the lowest tracing point in the second tracing point set, and greater than a difference between the vertical coordinate of the lowest tracing point and the preset parameter folds of the font height.

For example, in some embodiments, the electronic device may adjust the locations of the frame points based on a highest tracing point and a lowest tracing point that fall within a range of preset distances to the frame points.

Vertical coordinates of frame points in a second calculated upper frame point set are adjusted to being greater than the vertical coordinate of the highest tracing point that falls within the range of the preset distances from the frame points, and less than a sum of the vertical coordinate of the highest tracing point and preset parameter folds of a font height.

Vertical coordinates of frame points in a second calculated lower frame point set are adjusted to being less than the vertical coordinate of the lowest tracing point that falls within the range of the preset distances from the frame points, and greater than a difference between the vertical coordinate of the lowest tracing point and the preset parameter folds of the font height.

There may also be another adjustment manner, provided that the sub-regions determined based on the second adjusted frame point set obtained through adjustment can totally enclose the tracing points in the second tracing point set. This is not limited herein.

With reference to the sixth aspect, in some embodiments, when the instructions are run on the electronic device, the electronic device is enabled to perform the following operations: performing smoothing processing on enclosing curves of the sub-regions determined based on the second adjusted frame point set, to obtain the second region.

Specifically, in some embodiments, the electronic device separately fits frame points in a second adjusted upper frame point set and frame points in a second adjusted lower frame point set, to obtain a smooth enclosing curve to form the second region, where the second adjusted frame point set may be classified into the second adjusted upper frame point set and the second adjusted lower frame point set, the second adjusted upper frame point set includes frame points located in the upper half of the sub-regions, and the second adjusted lower frame point set includes frame points located in the lower half of the sub-regions.

Further, in some embodiments, when separately fitting the frame points in the second adjusted upper frame point set and the frame points in the second adjusted lower frame point set, the electronic device may calculate a linear correlation coefficient of the frame points in the second adjusted upper frame point set and a linear correlation coefficient of the frame points in the second adjusted lower frame point set, and determine fitting manners based on values of the linear correlation coefficients.

For example, the electronic device may calculate a Pearson correlation coefficient of the frame points in the second adjusted upper frame point set and a Pearson correlation coefficient of the frame points in the second adjusted lower frame point set. If a linear correlation is relatively strong (for example, the correlation coefficient is greater than 0.8), the electronic device may determine to use linear fitting. If the linear correlation is relatively weak, the electronic device may determine to use higher-order fitting such as secondary fitting.

In some embodiments, in some embodiments, when the instructions are run on the electronic device, the electronic device is enabled to store an intermediate value for calculating the linear correlation coefficient (for example, an intermediate value for calculating the Pearson correlation coefficient), so that the stored intermediate value may be directly used when a related intermediate value is to be used in another subsequent calculation process to reduce a calculation amount.

With reference to the sixth aspect, in some embodiments, when the instructions are run on the electronic device, the electronic device is enabled to perform the following operations: when the quantity of frame points in the first initial frame point set is equal to 4, selecting points at equal abscissa intervals on upper and lower sides of a rectangle determined based on the four frame points as new frame points, to form the first extended frame point set; or when the quantity of frame points in the first initial frame point set is greater than 4, separately fitting frame points in a first initial upper frame point set and frame points in a first initial lower frame point set, to obtain an upper fitting curve and a lower fitting curve, where the first initial upper frame point set includes frame points that are in the first initial frame point set and that are located in the upper half of the first text line, and the first initial lower frame point set includes frame points that are in the first initial frame point set and that are located in the lower half of the first text line; and selecting points at equal abscissa intervals on the upper fitting curve and the lower fitting curve as new frame points, to form the first extended frame point set.

With reference to the sixth aspect, in some embodiments, when the instructions are run on the electronic device, the electronic device is further enabled to perform the following operations: determining, in a third video frame, locations of frame points in a third adjusted frame point set based on locations of tracing points in a third tracing point set relative to the locations of the tracing points in the second tracing point set, to obtain a third calculated frame point set, where the third tracing point set includes the tracing points that are predicted in the third video frame and that are at locations corresponding to the locations of the tracing points in the second tracing point set, and the third video frame is a video frame obtained after the second video frame; adjusting locations of frame points in the third calculated frame point set to obtain the third adjusted frame point set, so that sub-regions determined based on the third adjusted frame point set totally enclose the tracing points in the third tracing point set; and performing smoothing processing on enclosing curves of the sub-regions determined based on the third adjusted frame point set, to obtain a third region, where the third region is a determined location at which the first text line is located in the third video frame.

It may be understood that, the electronic device can track and determine a location of the first text line in a subsequent video frame, such as a fourth video frame, a fifth video frame, or a sixth video frame in a similar manner.

With reference to the sixth aspect, in some embodiments, when the instructions are run on the electronic device, the electronic device is further enabled to perform the following operations: maintaining a buffer of a fixed length of a preset quantity of video frames starting from the first video frame, where the buffer is used to store a video frame newly generated before a result of the first video frame recognized through OCR is returned.

Specifically, in some embodiments, there may be many different maintenance manners to maintain the buffer of the fixed-length.

For example, when a quantity of video frames stored in the buffer is equal to the preset quantity of frames, the electronic device deletes a stored video frame from the buffer each time a new video frame is added, where a difference between time for fetching adjacent video frames stored in the buffer is less than a preset interval.

For example, when a quantity of video frames stored in the buffer is equal to the preset quantity of frames, the electronic device deletes a stored video frame from the buffer each time a new video frame is added, so that intervals between adjacent frames remaining in the buffer keep as equal as possible.

It may be understood that the electronic device provided in the second aspect, the electronic device provided in the third aspect, the chip provided in the fourth aspect, the computer program product provided in the fifth aspect, and the computer storage medium provided in the sixth aspect are all configured to perform the method provided in the embodiments of this application. Therefore, for beneficial effects that can be achieved, refer to beneficial effects in a corresponding method, and details are not described herein again.

DESCRIPTION OF EMBODIMENTS

Terms used in the following embodiments of this application are merely for the purpose of describing specific embodiments, but are not intended to limit this application. The terms "one", "a", "the", "the foregoing", "this", and "the one" of singular forms used in this specification and the appended claims of this application are also intended to include plural forms, unless otherwise specified in the context clearly. It should be further understood that the term "and/or" used in this application indicates and includes any or all possible combinations of one or more listed items.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

Because the embodiments of this application relate to OCR and text tracking-related technologies, for ease of understanding, the following first describes related terms and related concepts in the embodiments of this application.

(1) OCR

OCR usually indicates a process in which an electronic device examines a character printed on a paper, detects a dark or bright mode to determine a shape of the character, and then translates the shape into a computer text by using a character recognition method.

(2) Frame Point

Figure 7:
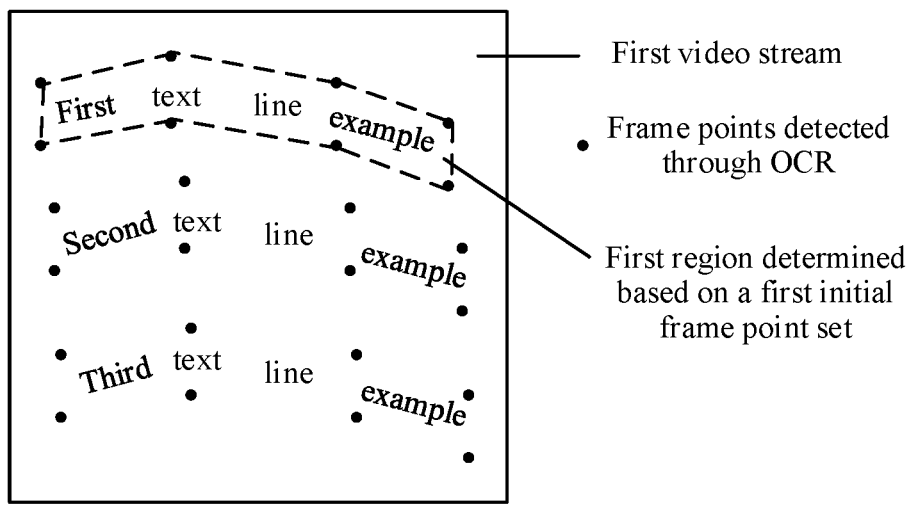
FIG. 7 is a schematic diagram of an example of a scenario of determining frame points through OCR detection according to an embodiment of this application.

Frame points are vertexes of a rectangular frame that is generated during OCR recognition and that is used to frame a location of a text line. As shown in FIG. 7, a region determined based on frame points detected through OCR may frame a location of a text line.

(3) Tracing Point

A tracing point may also be referred to as a corner point, a feature point, or the like in the embodiments of this application.

Corner detection is a method used to obtain an image feature in a computer vision system, and is widely applied to the fields such as motion detection, image matching, video tracking, three dimensional modeling, and target recognition.

In actual application, most corner detection methods detect image points with features, and these feature points have coordinates in an image and have some mathematical features, for example, a local maximum gray scale or a local minimum gray scale, and some gradient features.

Figure 9:
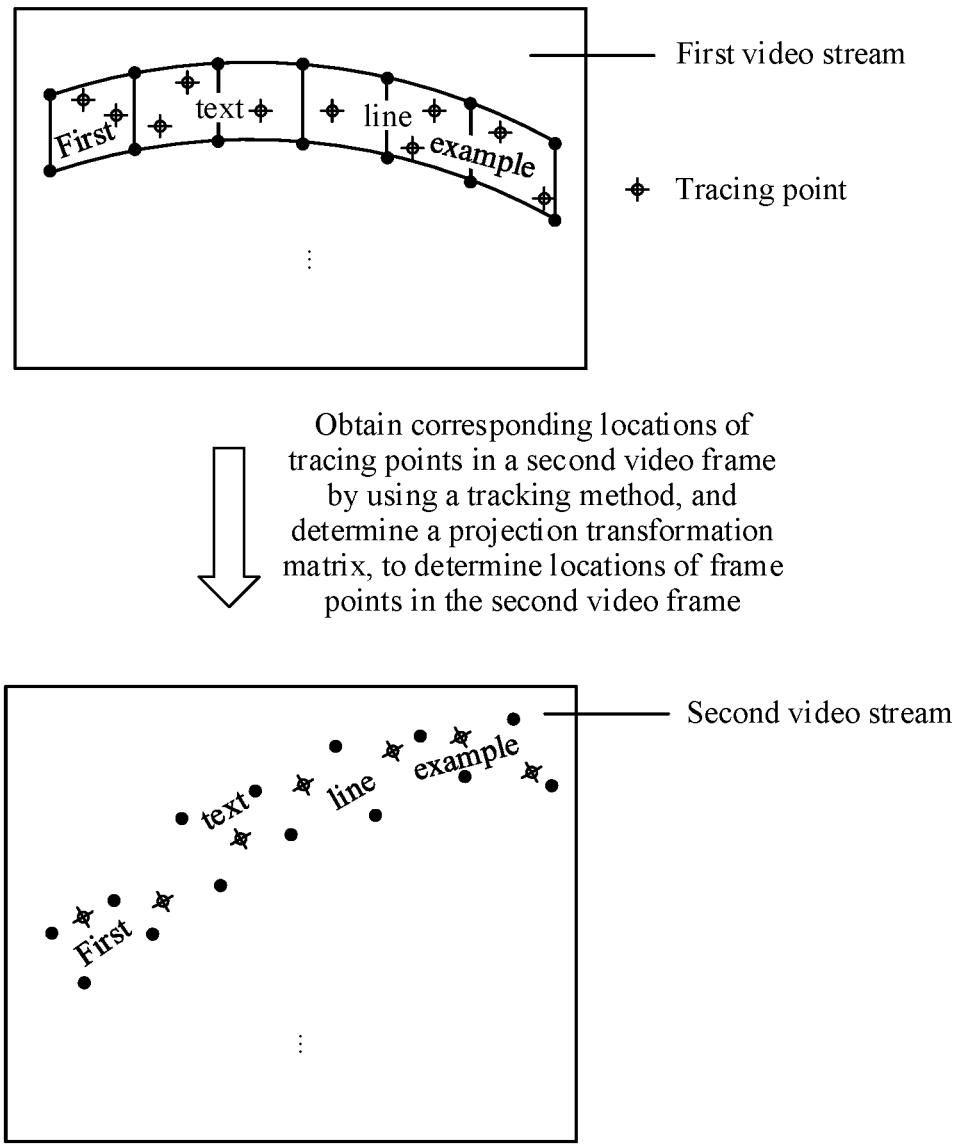
FIG. 9 is a schematic diagram of an example of a scenario of determining locations of frame points in a second video frame according to an embodiment of this application.

As shown in FIG. 9, locations of corresponding tracing points in different video frames are determined, so that a location change between the video frames can be determined, and a possible location of another point in the video frames can be determined.

Specifically, a projection transformation matrix between two video frames may be calculated based on location changes of corresponding tracing points in the video frame A and the video frame B, and then coordinates of a point in the video frame A are substituted into the projection transformation matrix, to calculate approximate coordinates of the point in the video frame B.

In the embodiments of this application, an electronic device splits a text line region into sub-regions, tracks and then processes the sub-regions, and combines processed sub-regions into a new text line. This is not only applicable to a straight-line text scenario (center points of texts are on a straight line) or a curved text scenario, but also presents a good tracking effect for a deformable text line. Therefore, a location of the text line can be accurately tracked and predicted.

Figure 1:
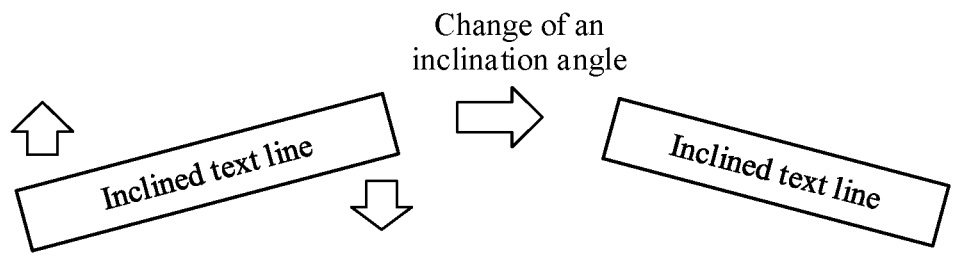
FIG. 1 is a schematic diagram of a change of an inclination angle of an inclined rectangle in the conventional technology.
Figure 2:
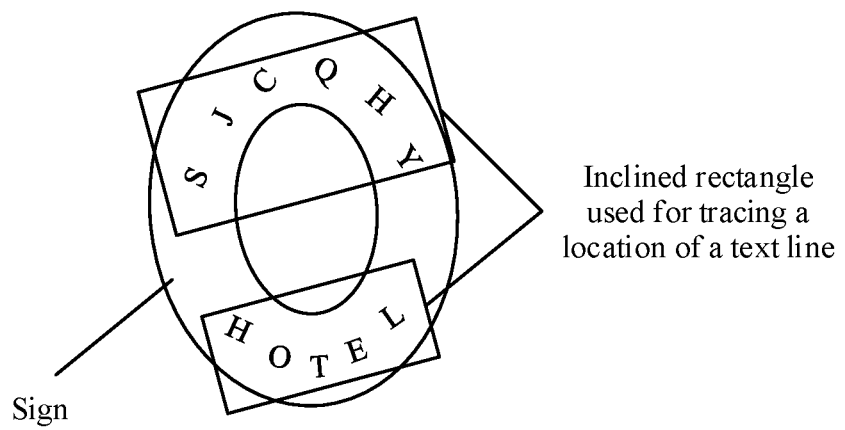
FIG. 2 is a schematic diagram of a scenario of determining a location of a curved text by using an inclined rectangle in the conventional technology.
Figure 3:
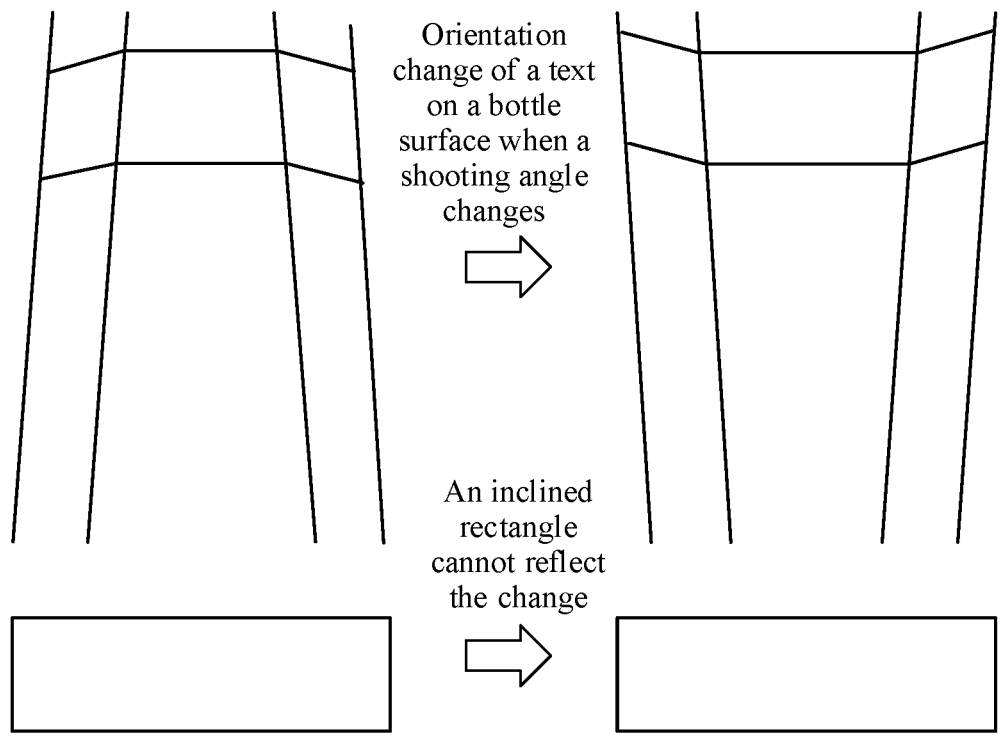
FIG. 3 is a schematic diagram of a scenario of determining a location of a deformed text by using an inclined rectangle in the conventional technology.
Figure 4:
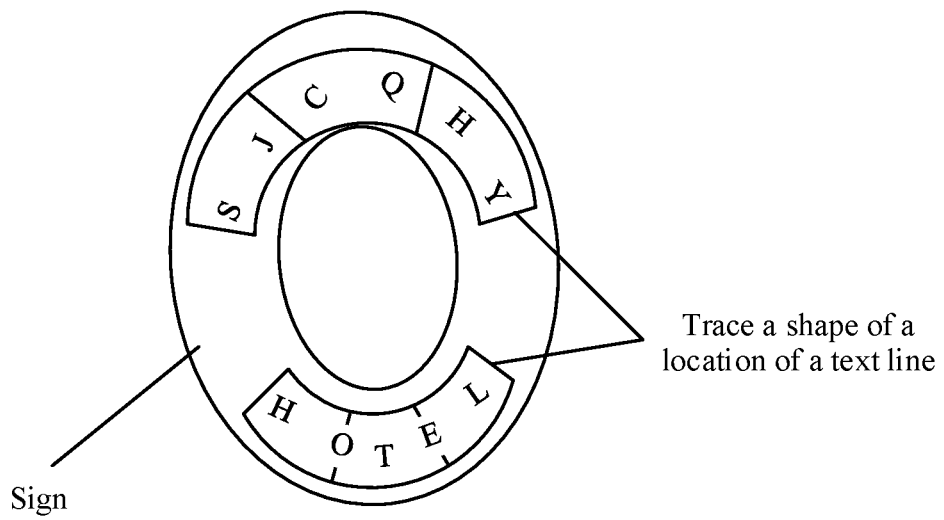
FIG. 4 is a schematic diagram of a scenario of determining a location of a curved text by using a video text tracking method according to an embodiment of this application.
Figure 5:
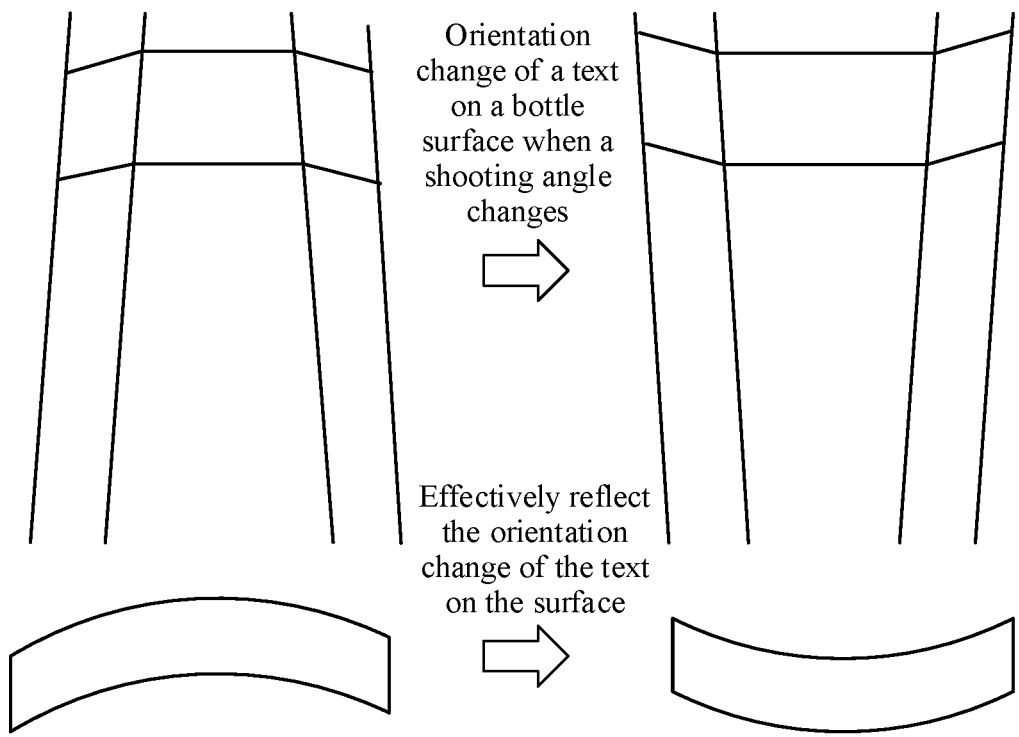
FIG. 5 is a schematic diagram of a scenario of determining a location of a deformed text by using a video text tracking method according to an embodiment of this application.

FIG. 4 is a schematic diagram of a scenario of determining a location of a curved text by using a video text tracking method according to an embodiment of this application. FIG. 5 is a schematic diagram of a scenario of determining a location of a deformed text by using a video text tracking method according to an embodiment of this application.

The following describes the video text tracking method in the embodiments of this application.

Embodiment 1

Figure 6:
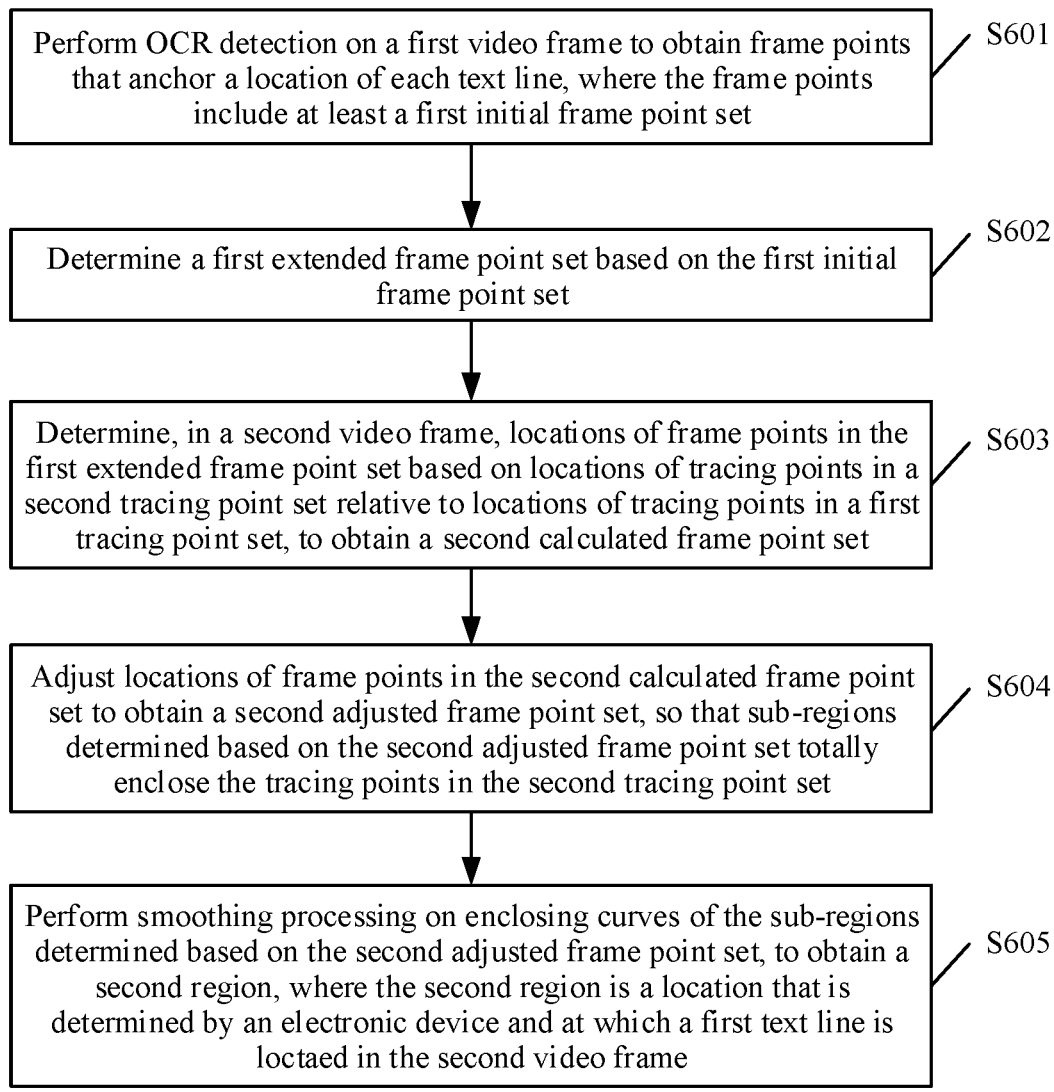
FIG. 6 is a schematic flowchart of a video text tracking method according to an embodiment of this application.

FIG. 6 is a schematic flowchart of a video text tracking method according to an embodiment of this application.

S601: Perform OCR detection on a first video frame to obtain frame points that anchor a location of each text line, where the frame points include at least a first initial frame point set, the first initial frame point set includes frame points that are recognized through OCR and that are used to anchor a location of a first text line, the first text line is any text line in the first video frame, the first text line is located in a first region that is in the first video frame and that is determined based on the frame points in the first initial frame point set, and a quantity of frame points in the first initial frame point set is not less than 4.

FIG. 7 is a schematic diagram of an example of a scenario of determining frame points through OCR detection according to an embodiment of this application. After OCR detection is performed on the first video frame, the frame points that anchor the location of each text line may be obtained, and any text line is used as the first text line. The obtained frame points include at least the frame points used to anchor the location of the first text line, and the frame points used to anchor the location of the first text line are briefly referred to as the first initial frame point set in this embodiment of this application. The quantity of frame points in the first initial frame point set is a multiple of 2 and not less than 4. The first region may be enclosed by lines by connecting the frame points in the first initial frame point set, and the first text line is located in the first region.

It may be understood that if the first text line is a straight-line text, the quantity of frame points in the first initial frame point set is 4. If the first text line is a curved text, the quantity of frame points in the first initial frame point set is greater than 4 and is a multiple of 2.

The first video frame is a video frame. The first video frame may be a video frame during video shooting, or may be a video frame during video playing. This is not limited herein. For example, the first video frame may be the first video frame obtained after a lens is stabilized during video shooting.

S602: Determine a first extended frame point set based on the first initial frame point set, where the first extended frame point set frames the first text line in N contiguous and equal-width sub-regions, and N is a positive integer not less than 2.

Figure 8:
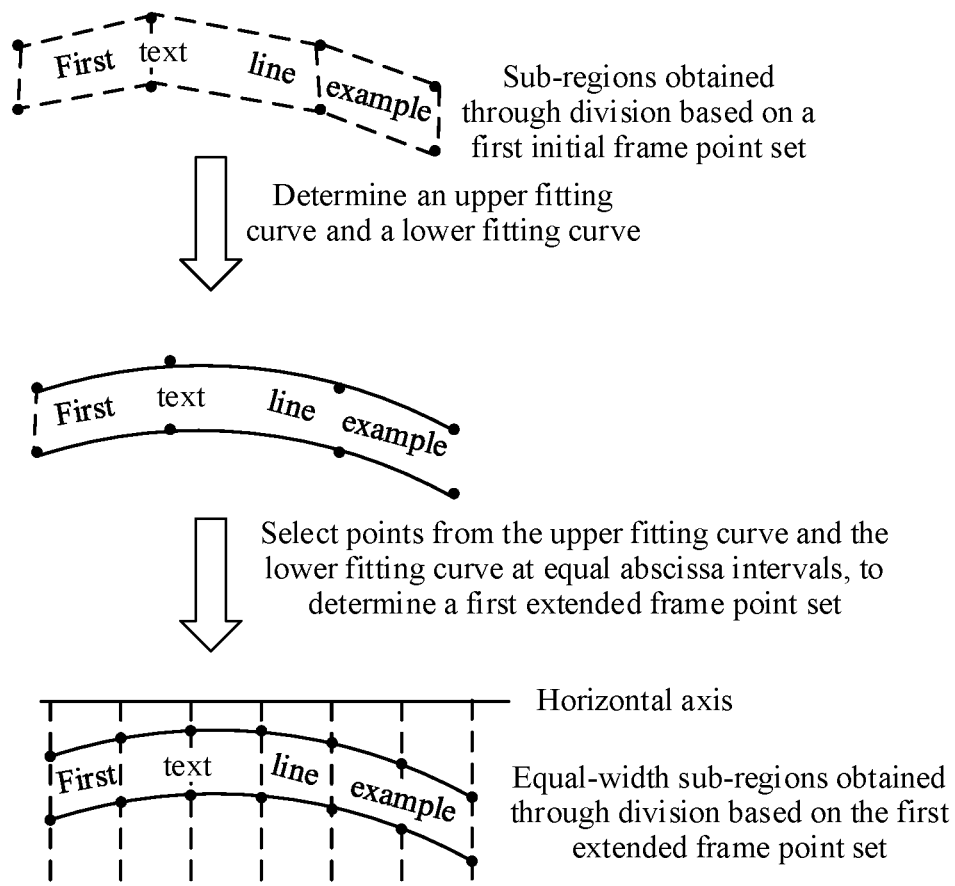
FIG. 8 is a schematic diagram of an example of a scenario of determining equal-width sub-regions that frame a text line according to an embodiment of this application.

FIG. 8 is a schematic diagram of an example of a scenario of determining equal-width sub-regions that frame a text line according to an embodiment of this application. The first initial frame point set determines the first region in which the first text line is located, and the first region may be divided into a plurality of contiguous and irregular quadrilateral sub-regions based on the first initial frame point set. The first extended frame point set may be determined, so that the sub-regions that frame the text line have an equal width. Therefore, a process of determining the first extended frame point set is a process of determining the N contiguous and equal-width sub-regions used to frame the first text line.

The following describes the process of determining the first extended frame point set. The quantity of frame points in the first initial frame point set is a multiple of 2 and not less than 4. Therefore, different processes are used to determine the first extended frame point set based on whether the quantity of frame points in the first initial frame point set is 4.

(1) The quantity of frame points in the first initial frame point set is equal to 4.

When the quantity of frame points in the first initial frame point set is equal to 4, it indicates that the first text line is a straight-line text. Therefore, the location of the first text line can be anchored by using an inclined rectangle with the four frame points. In this case, only points at equal abscissa intervals may be selected from an upper side and a lower side of the rectangle, and the obtained points at the equal abscissa intervals are selected as new frame points, to form the first extended frame point set.

(2) The quantity of frame points in the first initial frame point set is greater than 4.

When the quantity of frame points in the first initial frame point set is greater than 4, it indicates that the first text line is a curved text. Therefore, the location of the first text line can be anchored by using more than four frame points. The frame points in the first initial frame point set may be classified into a first initial upper frame point set and a first initial lower frame point set. The first initial upper frame point set includes frame points that are in the first initial frame point set and that are located in the upper half of the first text line. The first initial lower frame point set includes frame points that are in the first initial frame point set and that are located in the lower half of the first text line.

Fitting is separately performed on the frame points in the first initial upper frame point set and the frame points in the first initial lower frame point set, to obtain an upper fitting curve and a lower fitting curve. As shown in FIG. 8, points at equal abscissa intervals are separately obtained from the upper fitting curve and the lower fitting curve, and the obtained points at the equal abscissa intervals are used as new frame points, to form the first extended frame point set.

In this case, the N sub-regions including the frame points in the first extended frame point set are contiguous and have an equal width, and are used to frame the first text line.

It should be noted that, when the new frame points are obtained on the upper side and the lower side of the rectangle or on the upper fitting curve and the lower fitting curve, the abscissa interval between the new frame points may be determined according to an actual situation, provided that the finally determined sub-regions can be contiguous and have the equal width. For example, the abscissa interval between the new frame points may be determined based on a total length of the text line and/or a width of a font in the text line. This is not limited herein. For example, the abscissa interval between the new frame points may be about twice the width of the font in the text line.

S603: Determine, in a second video frame, locations of the frame points in the first extended frame point set based on locations of tracing points in a second tracing point set relative to locations of tracing points in a first tracing point set, to obtain a second calculated frame point set, where the first tracing point set includes the tracing points in the sub-regions determined based on the first extended frame point set in the first video frame, the second tracing point set includes the tracing points that are predicted in the second video frame and that are at locations corresponding to the locations of the tracing points in the first tracing point set, and the second video frame is a video frame obtained after the first video frame.

FIG. 9 is a schematic diagram of an example of a scenario of determining locations of frame points in a second video frame according to an embodiment of this application.

The following describes the operations in detail.

1. After determining the first extended frame point set, an electronic device may determine the first tracing point set, where the first tracing point set includes the tracing points in the sub-regions determined based on the first extended frame point set in the first video frame.

Specifically, the electronic device may determine, by using a tracing point (key point) detection technology such as a corner detection technology, a quantity of tracing points in the sub-regions determined based on the first extended frame point set, to form the first tracing point set.

It may be understood that, the electronic device further determines tracing points in sub-regions used to frame another text line in the first video frame.

2. The electronic device may determine the second tracing point set based on the first tracing point set, where the second tracing point set includes the tracing points that are predicted in the second video frame and that are at the locations corresponding to the locations of the tracing points in the first tracing point set, and the second video frame is the video frame obtained after the first video frame.

The electronic device may predict, in the second video frame, locations of some tracing points in the first tracing point set in the first video frame by using a tracing point tracking algorithm such as an optical flow tracking algorithm, and use the locations as the second tracing point set.

3. The electronic device may determine, in the second video frame, the locations of the frame points in the first extended frame point set based on the locations of the tracing points in the second tracing point set relative to the locations of the tracing points in the first tracing point set, to obtain the second calculated frame point set.

Specifically, the electronic device may obtain a projection transformation matrix from the first video frame to the second video frame based on location relationships between tracing points at corresponding locations in the first tracing point set and the second tracing point set.

Then, the electronic device calculates, in the second video frame, the locations of the frame points in the first extended frame point set based on the projection transformation matrix, and uses the calculated frame points as the second calculated frame point set.

It may be understood that, in some cases, due to factors such as a shooting angle change and a picture element change, not corresponding locations of all the tracing points in the first tracing point set can be found in the second video frame. Therefore, a quantity of tracing points in the second tracing point set is usually less than or equal to a quantity of tracing points in the first tracing point set.

S604: Adjust locations of frame points in the second calculated frame point set to obtain a second adjusted frame point set, so that sub-regions determined based on the second adjusted frame point set totally enclose the tracing points in the second tracing point set.

Figure 10A:
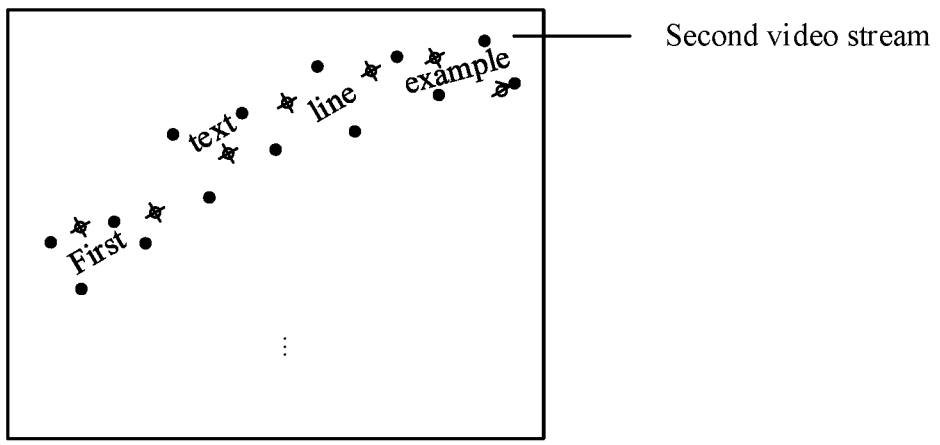
FIG. 10(a) and FIG. 10(b) are schematic diagrams of an example of a scenario of adjusting locations of frame points according to an embodiment of this application.
Figure 10B:
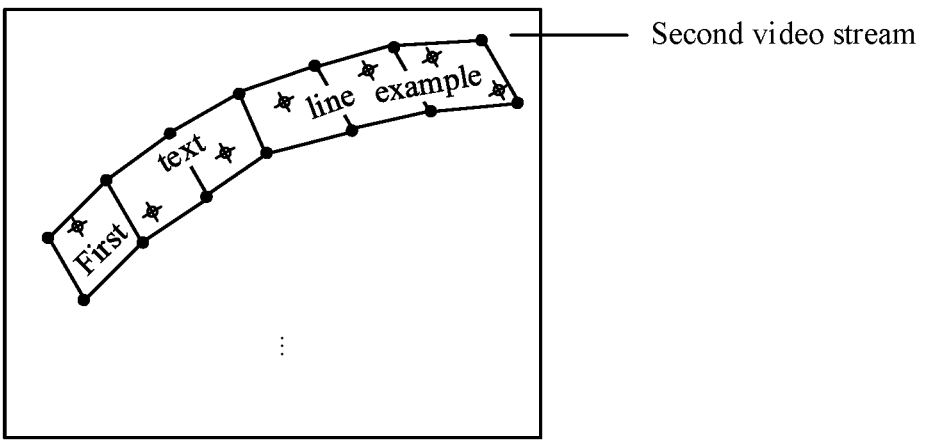

FIG. 10(a) and FIG. 10(b) are schematic diagrams of an example of a scenario of adjusting locations of frame points according to an embodiment of this application.

As shown in FIG. 10(a), some frame points in the second calculated frame point set that are calculated based on the projection transformation matrix and the first extended frame point set may be far offset, and may not be located at same corresponding locations in the first video frame. Therefore, the locations of the frame points may be adjusted, so that the sub-regions determined based on the frame points can totally enclose the tracing points in the second tracing point set, as shown in FIG. 10(b).

Specifically, there are many optional adjustment policies, and the following are some examples.

(1) Uniformly adjust the locations of the frame points based on a highest tracing point and a lowest tracing point in the second tracing point set.

For example, a lower left corner point in a video frame is used as an origin, the right direction of the origin is used as a positive direction of a horizontal axis, and the upper direction of the origin is used as a positive direction of a vertical axis. In this case, vertical coordinates of the frame points are uniformly adjusted based on the vertical coordinate of the highest tracing point and the vertical coordinate of the lowest tracing point in the second tracing point set.

Specifically, the second calculated frame point set may be classified into a second calculated upper frame point set and a second calculated lower frame point set. The second calculated upper frame point set includes frame points that are in the second calculated frame point set and that are located in the upper half of the sub-regions. The second calculated lower frame point set includes frame points that are in the second calculated frame point set and that are located in the lower half of the sub-regions.

Vertical coordinates of the frame points in the second calculated upper frame point set may be adjusted to being greater than the vertical coordinate of the highest tracing point in the second tracing point set, and less than a sum of the vertical coordinate of the highest tracing point and preset parameter folds of a font height.

Vertical coordinates of the frame points in the second calculated lower frame point set may be adjusted to being less than the vertical coordinate of the lowest tracing point in the second tracing point set, and greater than a difference between the vertical coordinate of the lowest tracing point and the preset parameter folds of the font height.

If a vertical coordinate of a frame point falls within the range, the frame point does not need to be adjusted. If a vertical coordinate of a frame point does not fall within the range, the vertical coordinate of the frame point may be adjusted based on a minimum movement distance to falling within the range.

For example, the preset parameter may be set to 0.5.

(2) Adjust the locations of the frame points based on a highest tracing point and a lowest tracing point that fall within a range of preset distances to the frame points.

For example, a lower left corner point in a video frame is used as an origin, the right direction of the origin is used as a positive direction of a horizontal axis, and the upper direction of the origin is used as a positive direction of a vertical axis. In this case, vertical coordinates of the frame points are adjusted based on the vertical coordinate of the highest tracing point and the vertical coordinate of the lowest tracing point that fall within the range of the preset distances from the frame points.

Specifically, vertical coordinates of frame points in a second calculated upper frame point set may be adjusted to being greater than the vertical coordinate of the highest tracing point that falls within the range of the preset distances from the frame points, and less than a sum of the vertical coordinate of the highest tracing point and preset parameter folds of a font height.

Vertical coordinates of frame points in a second calculated lower frame point set may be adjusted to being less than the vertical coordinate of the lowest tracing point that falls within the range of the preset distances from the frame points, and greater than a difference between the vertical coordinate of the lowest tracing point and the preset parameter folds of the font height.

If a vertical coordinate of a frame point falls within the range, the frame point does not need to be adjusted. If a vertical coordinate of a frame point does not fall within the range, the vertical coordinate of the frame point may be adjusted based on a minimum movement distance to falling within the range.

For example, the preset parameter may be set to 0.5, and the preset distance may be set to a width of one font.

There may also be another adjustment policy, provided that the sub-regions determined based on the second adjusted frame point set obtained through adjustment can totally enclose the tracing points in the second tracing point set. This is not limited herein.

S605: Perform smoothing processing on enclosing curves of the sub-regions determined based on the second adjusted frame point set, to obtain a second region, where the second region is a location that is determined by the electronic device and at which the first text line is located in the second video frame.

Figure 11A:
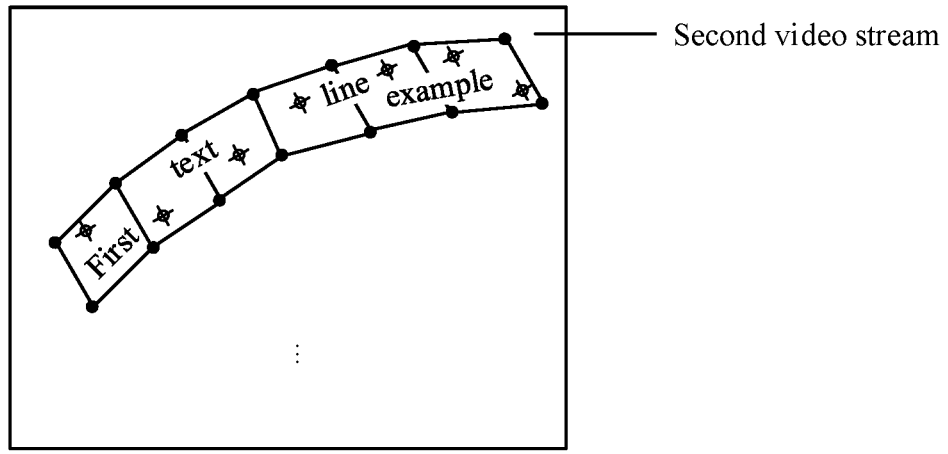
FIG. 11(a) and FIG. 11(b) are schematic diagrams of an example of a scenario of performing smoothing processing on enclosing curves of sub-regions according to an embodiment of this application.
Figure 11B:
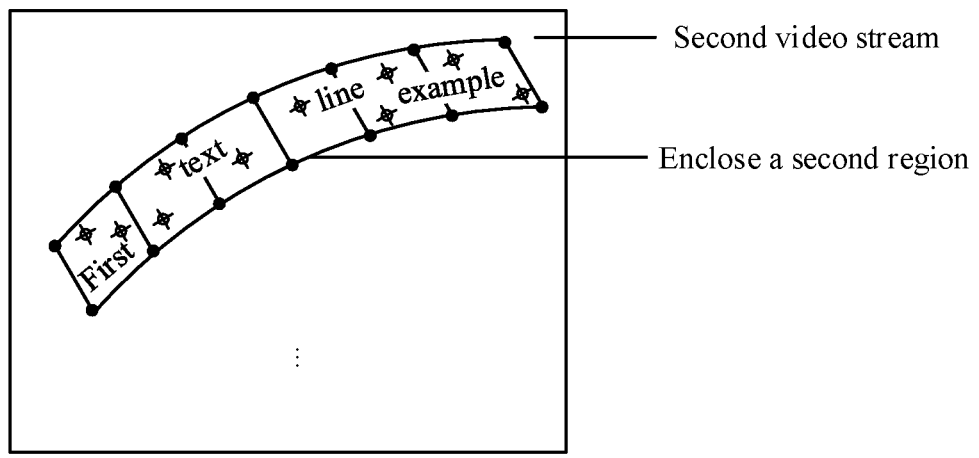

FIG. 11(a) and FIG. 11(b) are schematic diagrams of an example of a scenario of performing smoothing processing on enclosing curves of sub-regions according to an embodiment of this application.

The obtained second adjusted frame point set may be classified into a second adjusted upper frame point set and a second adjusted lower frame point set. The second adjusted upper frame point set includes frame points located in the upper half of the sub-regions, and the second adjusted lower frame point set includes frame points located in the lower half of the sub-regions.

The electronic device may separately fit the frame points in the second adjusted upper frame point set and the frame points in the second adjusted lower frame point set, to obtain a smooth enclosing curve to form the second region. The second region is the location that is determined by the electronic device and at which the first text line is located in the second video frame.

Preferably, when separately fitting the frame points in the second adjusted upper frame point set and the frame points in the second adjusted lower frame point set, the electronic device may calculate a linear correlation coefficient of the frame points in the second adjusted upper frame point set and a linear correlation coefficient of the frame points in the second adjusted lower frame point set, and determine fitting manners based on values of the linear correlation coefficients.

For example, the electronic device may calculate a Pearson correlation coefficient of the frame points in the second adjusted upper frame point set and a Pearson correlation coefficient of the frame points in the second adjusted lower frame point set. If a linear correlation is relatively strong (for example, the correlation coefficient is greater than 0.8), the electronic device may determine to use linear fitting. If the linear correlation is relatively weak, the electronic device may determine to use higher-order fitting such as secondary fitting.

A fitting purpose is to perform smoothing processing, so that the sub-regions can keep contiguous and an enclosing curve of the text line keeps smooth, to prevent a sawtooth curve.

Preferably, the electronic device may store an intermediate value for calculating the linear correlation coefficient (for example, an intermediate value for calculating the Pearson correlation coefficient), so that the stored intermediate value may be directly used when a related intermediate value is to be used in another subsequent calculation process, to reduce a calculation amount.

It may be understood that, in a scenario such as live shooting augmented reality (AR) translation or video subtitle translation, after the second region is determined as the location of the first text line in the second video frame, when OCR is used to recognize a text in the first text line and return a translation result after the text is translated, the translation result may be backfilled into the second region. This implements an effect of directly displaying a translation at a corresponding location of a text in a video.

In this embodiment of this application, the electronic device determines, based on the first initial frame point set obtained through OCR detection of the first text line in the first video frame, the first extended frame point set that frames the first text line in the N contiguous and equal-width sub-regions. Then, the electronic device determines, through tracking in the second video frame, the corresponding locations of the frame points in the first extended frame point set, to form the second calculated frame point set. The electronic device adjusts the locations of the frame points in the second calculated frame point set to obtain the second adjusted frame point set that totally encloses the tracing points, and performs smoothing processing on the enclosing curves of the sub-regions determined based on the second adjusted frame point set, to obtain the second region used for determining the location of the first text line in the second video frame. The equal-width sub-regions are tracked, the locations of the frame points in the sub-regions are adjusted based on the tracking points, and tracking granularity is improved. Therefore, the method is not only used to accurately track a common curved text line and a deformable curved text line, but also applicable to a straight-line text scenario, and enhances a video text tracking effect.

Embodiment 2

In a scenario such as live shooting augmented reality (AR) translation or video subtitle translation, there may be a latency of hundreds of milliseconds from triggering OCR for a first video frame to returning a text recognition result of the first video frame after OCR. A current video frame is a video frame after more than 10 frames obtained after OCR is triggered (if 30 frames are transmitted per second).

The first video frame may be the first video frame obtained after a lens is stabilized in live shooting, may be the first video frame in a video during the video subtitle translation, or may be the first video frame obtained after text content in a video changes. This is not limited herein.

Figure 12:
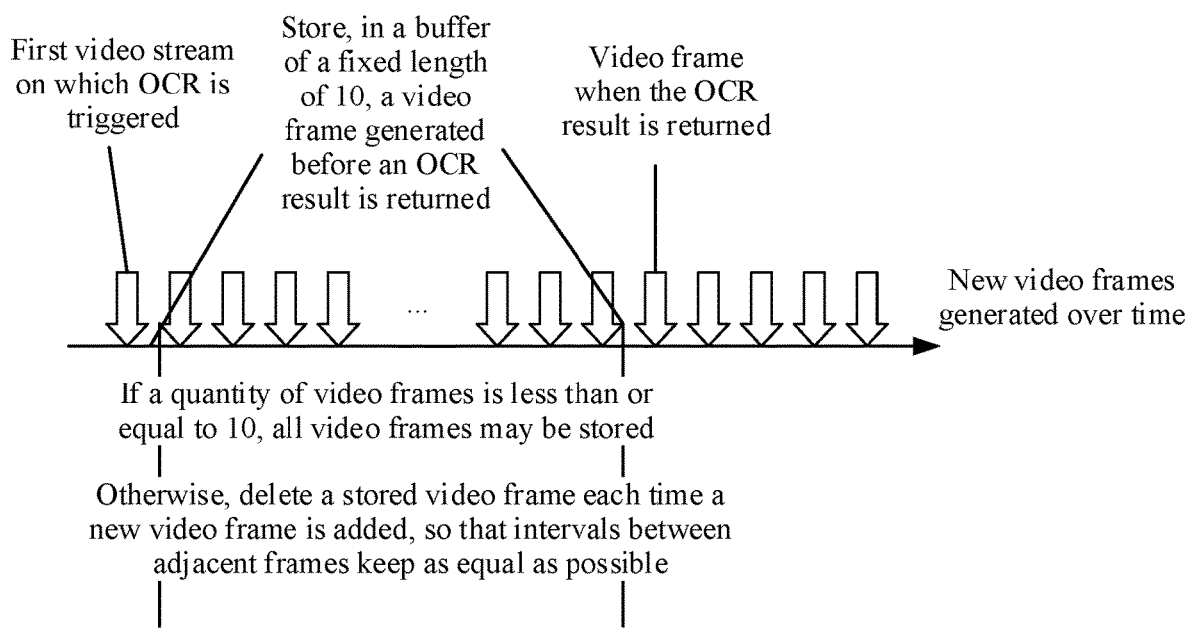
FIG. 12 is a schematic diagram of a scenario of scheduling buffered video frames according to an embodiment of this application.

FIG. 12 is a schematic diagram of a scenario of scheduling buffered video frames according to an embodiment of this application.

To ensure that the latest video frame can be caught up during OCR recognition, an electronic device may maintain a buffer of a fixed length of a preset quantity of video frames starting from a first video frame. The buffer is used to store a video frame newly generated before a result of the first video frame recognized through OCR is returned.

For example, if the preset quantity of frames may be 10, the buffer stores fewer than 10 video frames after the first video frame. After the result of the first video frame recognized through OCR is returned, tracking may be started from the video frames stored in the buffer, so that the latest video frame is "caught up".

Because the buffer can store a maximum of the preset quantity of video frames, if the buffer is full, a stored video frame may be deleted each time a new video frame is added. A deletion policy is to keep intervals between adjacent frames remaining in the buffer as equal as possible.

For example, if 10 video frames are currently stored in the buffer, the video frames are numbered [1, 2, 3, 4, 5, 6, 7, 8, 9, 10]. When a video frame 11 is generated, the video frame 2 may be deleted, the video frame 11 is stored, and therefore the video frames change to [1, 3, 4, 5, 6, 7, 8, 9, 10, 11]. When a video frame 12 is generated, the video frame 4 may be deleted, the video frame 12 is stored, and therefore the video frames change to [1, 3, 5, 6, 7, 8, 9, 10, 11, 12]. When a video frame 13 is generated, the video frame 6 may be deleted, the video frame 13 is stored, and therefore the video frames change to [1, 3, 5, 7, 8, 9, 10, 11, 12, 13]. When a video frame 14 is generated, the video frame 8 may be deleted, the video frame 14 is stored, and therefore the video frames change to [1, 3, 5, 7, 9, 10, 11, 12, 13, 14]. When a video frame 15 is generated, the video frame 10 may be deleted, the video frame 15 is stored, and therefore the video frames change to [1, 3, 5, 7, 9, 11, 12, 13, 14, 15]. When a video frame 16 is generated, the video frame 12 may be deleted, the video frame 16 is stored, and therefore the video frames change to [1, 3, 5, 7, 9, 11, 13, 14, 15, 16]. When a video frame 17 is generated, the video frame 14 may be deleted, the video frame 17 is stored, and therefore the video frames change to [1, 3, 5, 7, 9, 11, 13, 15, 16, 17]. When a video frame 18 is generated, the video frame 16 may be deleted, the video frame 18 is stored, and therefore the video frames change to [1, 3, 5, 7, 9, 11, 13, 15, 17, 18]. When a video frame 19 is generated, the video frame 17 may be deleted, the video frame 19 is stored, and therefore the video frames change to [1, 3, 5, 7, 9, 11, 13, 15, 18, 19]. When a video frame 20 is generated, the video frame 19 may be deleted, the video frame 20 is stored, and therefore the video frames change to [1, 3, 5, 7, 9, 11, 13, 15, 18, 20], and so on. There may be many other methods for adding and deleting video frames, so that the intervals between the adjacent video frames are kept as equal as possible in the buffer of the fixed length.

A purpose of maintaining the buffer of the fixed-length is to avoid a case in which OCR recognition is performed for a long time because there are a relatively large quantity of contexts in first video frame, and limiting a buffer size can shorten time, so that the latest video frame is "caught up". This shortens time for a user to wait for to-be-returned result, and improves experience.

In this embodiment of this application, in addition to one video frame on which OCR is performed, several video frames are further buffered. The video frame on which OCR is performed is the first video frame in Embodiment 1, the first video frame in the buffer is the second video frame in Embodiment 1, and the second video frame in the buffer is the third video frame in Embodiment 1.

According to the video text tracking method in Embodiment 1, the second adjusted frame point set and the second tracing point set that correspond to the first text line and that are in the second video frame have been determined before the location (the first region) of the first text line in the second video frame is determined.

According to a tracing method similar to Operation S603 to Operation S605 in Embodiment 1, a location of a first text line in a third video frame, and a third adjusted frame point set and a third tracing point set that correspond to the first text line and that are in the third video frame may be determined. Operations may be as follows.

1: Determine, in the third video frame, locations of frame points in the third adjusted frame point set based on locations of tracing points in the third tracing point set relative to locations of tracing points in a second tracing point set, to obtain a third calculated frame point set, where the third tracing point set includes the tracing points that are predicted in the third video frame and that are at locations corresponding to the locations of the tracing points in the second tracing point set, and the third video frame is a video frame obtained after a second video frame.

2: Adjust locations of frame points in the third calculated frame point set to obtain the third adjusted frame point set, so that sub-regions determined based on the third adjusted frame point set totally enclose the tracing points in the third tracing point set.

3: Perform smoothing processing on enclosing curves of the sub-regions determined based on the third adjusted frame point set, to obtain a third region, where the third region is a location that is determined by an electronic device and at which the first text line is located in the third video frame.

An execution process for Operation 1 to Operation 3 is similar to that in Operation S603 to Operation S605, and details are not described herein again.

It may be understood that, according to the tracing method in Operation 1 to Operation 3, a location of the first text line may be determined in a subsequent video frame, and an OCR recognition result or a translation result is backfilled into the location. When a ratio of quantities of tracing points at corresponding locations found in two adjacent frames (a ratio of a quantity of tracing points in a video frame to a quantity of tracing points in the first video frame on which OCR is performed) is less than a tracing point ratio threshold because a text line moves out of a viewfinder, a text line is blocked by another object, or video text content is changed, current tracking is considered to be failed; and after a lens is stabilized or the video text is updated, OCR is performed again to start another tracking process.

The following describes an example of an electronic device 100 provided in an embodiment of this application.

Figure 13:
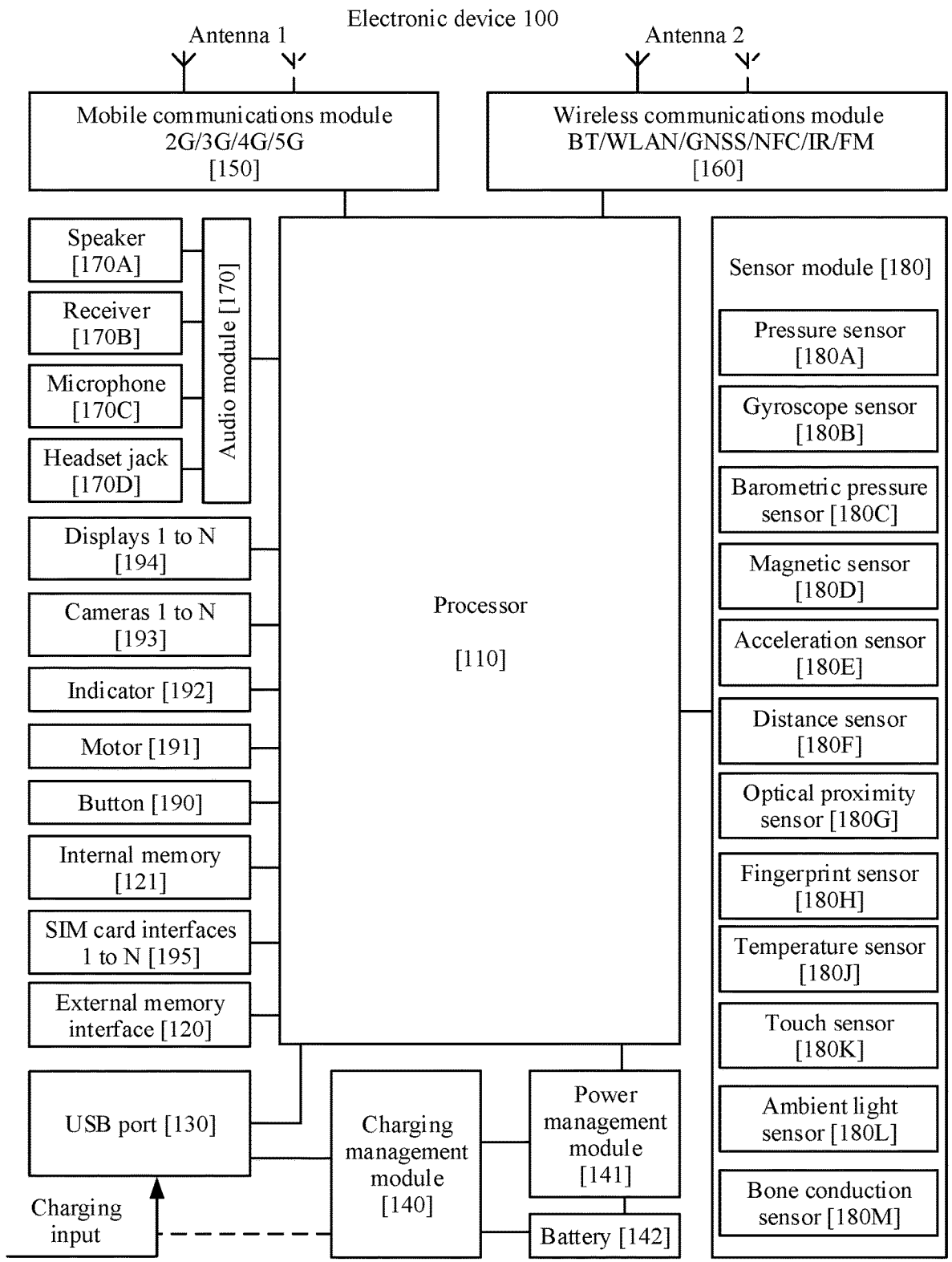
FIG. 13 is a schematic diagram of an example of a structure of an electronic device according to an embodiment of this application.

FIG. 13 is a schematic diagram of a structure of the electronic device 100 according to this embodiment of this application.

The following uses the electronic device 100 as an example to describe this embodiment. It should be understood that the electronic device 100 may have more or fewer components than those shown in figure, or may combine two or more components, or may have different component configurations. Components shown in figure may be implemented in hardware, software, or a combination of hardware and software that includes one or more signal processing and/or application-specific integrated circuits.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in the embodiments of the present disclosure does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a cache. The memory may store an instruction or data that has been used or is cyclically used by the processor 110. If the processor 110 is to use the instruction or the data again, the processor may directly invoke the instruction or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (CSI), a display serial interface (DSI), or the like. In some embodiments, the processor 110 communicates with the camera 193 through the CSI interface, to implement a shooting function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as the I2C interface, the I2S interface, the UART interface, the MIPI interface, or the like.

The SIM interface may be configured to communicate with the SIM card interface 195, to implement a function of transmitting data to an SIM card or reading data in an SIM card.

The USB port 130 is a port that conforms to a USB standard specification, and may be a mini USB port, a micro USB port, a USB type-C port, or the like. The USB port 130 may be used to connect to a charger for charging the electronic device 100, may be used to transmit data between the electronic device 100 and a peripheral device, or may be used to connect to a headset for playing audio through the headset. Alternatively, the port may be used to connect to another electronic device, for example, an AR device.

It may be understood that an interface connection relationship between the modules that is shown in this embodiment of the present disclosure is merely an example for description, and does not constitute a limitation on the structure of the electronic device 100. In some other embodiments of this application, the electronic device 100 may alternatively use an interface connection manner different from an interface connection manner in this embodiment, or a combination of a plurality of interface connection manners.

The charging management module 140 is configured to receive a charging input from the charger. The charger may be a wireless charger or a wired charger.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then transferred to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device with the mobile communication module 150 or another function module.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC), an infrared (IR) technology, and the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global orbiting navigation satellite system (GLONASS), a BeiDou navigation satellite system (BDS), a quasi-zenith satellite system (QZSS) and/or satellite based augmentation systems (SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, quantum dot light-emitting diodes (QLED), or the like. In some embodiments, the electronic device 100 may include one or N displays 194, where N is a positive integer greater than 1.

The electronic device 100 can implement a shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more video codecs. In this way, the electronic device 100 can play or record videos in a plurality of encoding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system and an application required by at least one function (for example, a facial recognition function, a fingerprint recognition function, and a mobile payment function). The data storage area may store data (such as facial information template data and a fingerprint information template) created when the electronic device 100 is used, and the like. In addition, the internal memory 121 may include a high-speed random access memory, and may further include a nonvolatile memory, for example, at least one magnetic disk storage device, a flash memory, and a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB port 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing an SMS message is executed. When a touch operation whose touch operation intensity is greater than or equal to the first pressure threshold is performed on an application icon "Messages", an instruction for creating an SMS message is executed.

The gyroscope sensor 180B may be configured to determine a motion posture of the electronic device 100. In some embodiments, an angular velocity of the electronic device 100 around three axes (namely, axes X, Y, and Z) may be determined by using the gyroscope sensor 180B. The gyroscope sensor 180B may be configured to implement image stabilization during shooting. For example, when a shutter is pressed, the gyroscope sensor 180B detects an angle at which the electronic device 100 jitters, obtains, through calculation based on the angle, a distance for which a lens module is to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect values of accelerations in various directions (usually on three axes) of the electronic device 100, and may detect magnitude and a direction of gravity when the electronic device 100 is still. The acceleration sensor 180E may be further configured to recognize a posture of the electronic device, and is used in screen switching between a landscape mode and a portrait mode, a pedometer, or another application.

The distance sensor 180F is configured to measure a distance. The electronic device 100 may measure the distance in an infrared or a laser manner. In some embodiments, in a shooting scenario, the electronic device 100 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device 100 at a location different from a location of the display 194.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is applicable to different types of SIM cards. The SIM card interface 195 is also applicable to an external storage card. The electronic device 100 interacts with a network through the SIM card, to implement functions such as calling and data communication.

Figure 14:
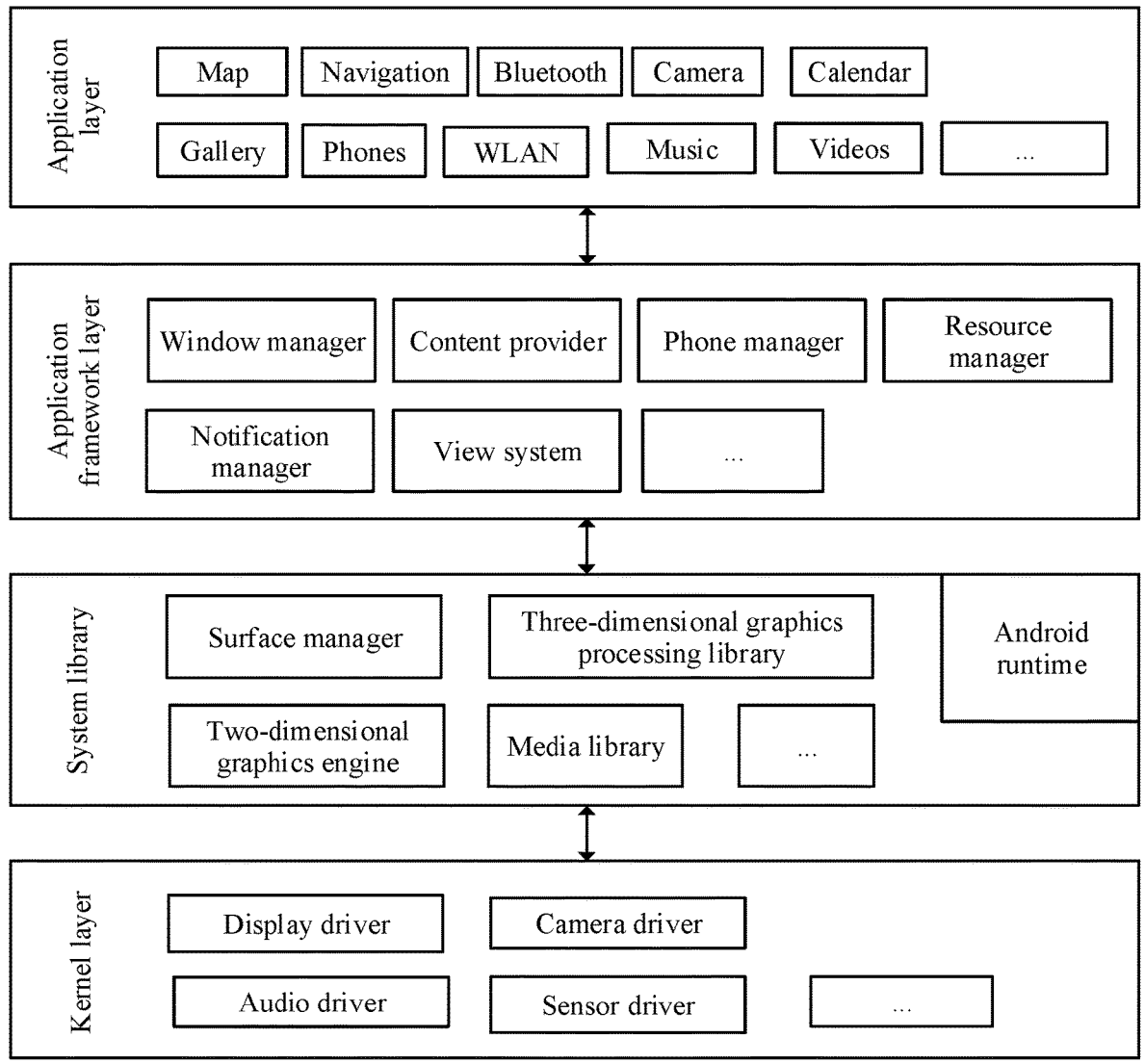
FIG. 14 is a block diagram of an example of a software structure of an electronic device according to an embodiment of this application.

FIG. 14 is a block diagram of a software structure of an electronic device 100 according to an embodiment of the present disclosure.

In a layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 14, the application packages may include applications (may also be referred to as applications) such as "Camera", "Gallery", "Calendar", "Phones", "Map", "Navigation", "WLAN", "Bluetooth", "Music", "Videos", and "Messages".

The application framework layer provides an application programming interface (API) and a programming framework for an application at the application layer. The application framework layer includes some predefined functions.

As shown in FIG. 14, the application framework layer may include a window manager, a content provider, a view system, a phone manager, a resource manager, a notification manager, a local profile assistant (LPA) and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon may include a text display view and a picture display view.

The phone manager is configured to provide a communication function of the electronic device 100, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog interface. For example, text information is displayed in the status bar, an alert sound is played, the electronic device vibrates, or the indicator light blinks.

The Android Runtime includes a kernel library and a virtual machine. The Android runtime is responsible for scheduling and management of the Android system.

The kernel library includes two parts: a function that is to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a two-dimensional graphics engine (for example, SGL).

The surface manager is configured to: manage a display subsystem and provide fusion of two-dimensional (2D) and three-dimensional (3D) layers for a plurality of applications.

The media library supports playback and recording of audio and video in a plurality of commonly used formats, static image files, and the like. The media library may support a plurality of audio and video coding formats, such as MPEG-4, H.264, MP3, AAC, AMR, JPG, and PNG.

The three-dimensional graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and a virtual card driver.

The following describes examples of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch/tap operation and a control corresponding to the tap operation is a control of a camera application icon is used. A camera application invokes an interface of the application framework layer, so that the camera application is started. Then, a camera driver is started by invoking the kernel layer, and a static image or a video is captured by using the camera 193.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in the embodiments may be implemented by a computer program instructing relevant hardware. The program may be stored in a computer-readable storage medium. When the program is executed, the procedures of the methods in the embodiments may be performed. The foregoing storage medium includes any medium that can store program code, such as a ROM, a random access memory RAM, a magnetic disk, or an optical disk.

What is claimed is:

1. A video text tracking method, comprising:

performing, by an electronic device, optical character recognition (OCR) detection on a first video frame to obtain frame points comprising at least a first initial frame point set, wherein the first initial frame point set comprises frame points that are recognized through the OCR detection and that are used to anchor a location of a first text line, the first text line is any text line in the first video frame, and a quantity of frame points in the first initial frame point set is not less than 4;

determining, by the electronic device, a first extended frame point set based on the first initial frame point set, wherein the first extended frame point set frames the first text line in N contiguous and equal-width sub-regions, and N is a positive integer not less than 2;

determining, by the electronic device in a second video frame, locations of frame points in the first extended frame point set based on locations of tracing points in a second tracing point set relative to locations of tracing points in a first tracing point set, to obtain a second calculated frame point set, wherein the first tracing point set comprises tracing points in the sub-regions determined based on the first extended frame point set in the first video frame, the second tracing point set comprises tracing points that are predicted in the second video frame and that are at locations corresponding to the locations of the tracing points in the first tracing point set, and the second video frame is a video frame obtained after the first video frame; and determining, by the electronic device, a second region based on the second calculated frame point set, wherein the second region is a location that is determined by the electronic device and at which the first text line is located in the second video frame.

2. The method according to claim 1, wherein the determining, by the electronic device, the second region based on the second calculated frame point set comprises:

adjusting, by the electronic device, locations of frame points in the second calculated frame point set to obtain a second adjusted frame point set, so that sub-regions determined based on the second adjusted frame point set totally enclose the tracing points in the second tracing point set; and determining, by the electronic device, the second region based on the second adjusted frame point set.

3. The method according to claim 2, wherein the determining, by the electronic device, the second region based on the second adjusted frame point set comprises:

performing, by the electronic device, smoothing processing on enclosing curves of the sub-regions determined based on the second adjusted frame point set, to obtain the second region.

4. The method according to claim 3, wherein the performing, by the electronic device, the smoothing processing on the enclosing curves of the sub-regions determined based on the second adjusted frame point set, to obtain the second region comprises:

separately fitting, by the electronic device, frame points in a second adjusted upper frame point set and frame points in a second adjusted lower frame point set, to obtain a smooth enclosing curve to form the second region, wherein the second adjusted upper frame point set comprises frame points located in an upper half of the sub-regions, and the second adjusted lower frame point set comprises frame points located in a lower half of the sub-regions.

5. The method according to claim 2, wherein the adjusting, by the electronic device, the locations of the frame points in the second calculated frame point set to obtain the second adjusted frame point set comprises:

adjusting, by the electronic device, the locations of the frame points in the second calculated frame point set based on a highest tracing point and a lowest tracing point in the second tracing point set, to obtain the second adjusted frame point set; or adjusting, by the electronic device, the locations of the frame points in the second calculated frame point set based on a highest tracing point and a lowest tracing point that are in the second tracing point set and that fall within a range of preset distances to the frame points in the second calculated frame point set, to obtain the second adjusted frame point set.

6. The method according to claim 1, wherein the determining, by the electronic device, the first extended frame point set based on the first initial frame point set specifically comprises:

when the quantity of frame points in the first initial frame point set is equal to 4, selecting, by the electronic device, frame points at equal abscissa intervals on upper and lower sides of a rectangle determined based on the four frame points as new frame points, to form the first extended frame point set; or when the quantity of frame points in the first initial frame point set is greater than 4, separately fitting, by the electronic device, frame points in a first initial upper frame point set and frame points in a first initial lower frame point set, to obtain an upper fitting curve and a lower fitting curve, wherein the first initial upper frame point set comprises frame points that are in the first initial frame point set and that are located in an upper half of the first text line, and the first initial lower frame point set comprises frame points that are in the first initial frame point set and that are located in a lower half of the first text line, and selecting, by the electronic device, frame points at equal abscissa intervals on the upper fitting curve and the lower fitting curve as new frame points, to form the first extended frame point set.

7. The method according to claim 1, wherein the method further comprises:

determining, by the electronic device in a third video frame, locations of frame points in a third adjusted frame point set based on locations of tracing points in a third tracing point set relative to the locations of the tracing points in the second tracing point set, to obtain a third calculated frame point set, wherein the third tracing point set comprises tracing points that are predicted in the third video frame and that are at locations corresponding to the locations of the tracing points in the second tracing point set, and the third video frame is a video frame obtained after the second video frame;

adjusting, by the electronic device, locations of frame points in the third calculated frame point set to obtain the third adjusted frame point set, so that sub-regions determined based on the third adjusted frame point set totally enclose the tracing points in the third tracing point set; and performing, by the electronic device, smoothing processing on enclosing curves of the sub-regions determined based on the third adjusted frame point set, to obtain a third region, wherein the third region is a location that is determined by the electronic device and at which the first text line is located in the third video frame.

8. The method according to claim 1, wherein the method further comprises:
maintaining, by the electronic device, a buffer of a fixed length of a preset quantity of video frames starting from the first video frame, wherein the buffer is used to store a video frame newly generated before a result of the first video frame recognized through the OCR detection is returned.

9. The method according to claim 8, wherein the method further comprises:
when a quantity of video frames stored in the buffer is equal to the preset quantity of frames, deleting, by the electronic device, a stored video frame from the buffer each time a new video frame is added, wherein a difference between time for fetching adjacent video frames stored in the buffer is less than a preset interval.

10. An electronic device, wherein the electronic device comprises one or more processors and a memory, and wherein the memory is coupled to the one or more processors, the memory is configured to store computer program code, the computer program code comprises computer instructions, and the one or more processors invoke the computer instructions, so that the electronic device performs the following operations:
performing optical character recognition (OCR) detection on a first video frame to obtain frame points comprising at least a first initial frame point set, wherein the first initial frame point set comprises frame points that are recognized through the OCR detection and that are used to anchor a location of a first text line, the first text line is any text line in the first video frame, and a quantity of frame points in the first initial frame point set is not less than 4;
determining a first extended frame point set based on the first initial frame point set, wherein the first extended frame point set frames the first text line in N contiguous and equal-width sub-regions, and N is a positive integer not less than 2;
determining, in a second video frame, locations of frame points in the first extended frame point set based on locations of tracing points in a second tracing point set relative to locations of tracing points in a first tracing point set, to obtain a second calculated frame point set, wherein the first tracing point set comprises tracing points in the sub-regions determined based on the first extended frame point set in the first video frame, the second tracing point set comprises tracing points that are predicted in the second video frame and that are at locations corresponding to the locations of the tracing points in the first tracing point set, and the second video frame is a video frame obtained after the first video frame; and
determining a second region based on the second calculated frame point set, wherein the second region is a determined location at which the first text line is located in the second video frame.

11. The electronic device according to claim 10, wherein the one or more processors are further configured to invoke the computer instructions, so that the electronic device performs the following operations:
adjusting locations of frame points in the second calculated frame point set to obtain a second adjusted frame point set, so that sub-regions determined based on the second adjusted frame point set totally enclose the tracing points in the second tracing point set; and
determining the second region based on the second adjusted frame point set.

12. The electronic device according to claim 11, wherein the one or more processors are further configured to invoke the computer instructions, so that the electronic device performs the following operations:
performing smoothing processing on enclosing curves of the sub-regions determined based on the second adjusted frame point set, to obtain the second region.

13. The electronic device according to claim 12, wherein the one or more processors are further configured to invoke the computer instructions, so that the electronic device performs the following operations:
separately fitting frame points in a second adjusted upper frame point set and frame points in a second adjusted lower frame point set, to obtain a smooth enclosing curve to form the second region, wherein the second adjusted upper frame point set comprises frame points located in an upper half of the sub-regions, and the second adjusted lower frame point set comprises frame points located in a lower half of the sub-regions.

14. The electronic device according to claim 11, wherein the one or more processors are further configured to invoke the computer instructions, so that the electronic device performs the following operations:
adjusting the locations of the frame points in the second calculated frame point set based on a highest tracing point and a lowest tracing point in the second tracing point set, to obtain the second adjusted frame point set; or
adjusting the locations of the frame points in the second calculated frame point set based on a highest tracing point and a lowest tracing point that are in the second tracing point set and that fall within a range of preset distances to the frame points in the second calculated frame point set, to obtain the second adjusted frame point set.

15. The electronic device according to claim 10, wherein the one or more processors are further configured to invoke the computer instructions, so that the electronic device performs the following operations:
when the quantity of frame points in the first initial frame point set is equal to 4, selecting frame points at equal abscissa intervals on upper and lower sides of a rectangle determined based on the four frame points as new frame points, to form the first extended frame point set; or
when the quantity of frame points in the first initial frame point set is greater than 4, separately fitting frame points in a first initial upper frame point set and frame points in a first initial lower frame point set, to obtain an upper fitting curve and a lower fitting curve, wherein the first initial upper frame point set comprises frame points that are in the first initial frame point set and that are located in an upper half of the first text line, and the first initial lower frame point set comprises frame points that are in the first initial frame point set and that are located in a lower half of the first text line, and
selecting points at equal abscissa intervals on the upper fitting curve and the lower fitting curve as new frame points, to form the first extended frame point set.

16. The electronic device according to claim 10, wherein the one or more processors are further configured to invoke the computer instructions, so that the electronic device performs the following operations:

determining, in a third video frame, locations of frame points in a third adjusted frame point set based on locations of tracing points in a third tracing point set relative to the locations of the tracing points in the second tracing point set, to obtain a third calculated frame point set, wherein the third tracing point set comprises tracing points that are predicted in the third video frame and that are at locations corresponding to the locations of the tracing points in the second tracing point set, and the third video frame is a video frame obtained after the second video frame;

adjusting locations of frame points in the third calculated frame point set to obtain the third adjusted frame point set, so that sub-regions determined based on the third adjusted frame point set totally enclose the tracing points in the third tracing point set; and performing smoothing processing on enclosing curves of the sub-regions determined based on the third adjusted frame point set, to obtain a third region, wherein the third region is a determined location at which the first text line is located in the third video frame.

17. The electronic device according to claim 10, wherein the one or more processors are further configured to invoke the computer instructions, so that the electronic device performs the following operations:

maintaining a buffer of a fixed length of a preset quantity of video frames starting from the first video frame, wherein the buffer is used to store a video frame newly generated before a result of the first video frame recognized through the OCR detection is returned.

18. The electronic device according to claim 17, wherein the one or more processors are further configured to invoke the computer instructions, so that the electronic device performs the following operations:

when a quantity of video frames stored in the buffer is equal to the preset quantity of frames, deleting a stored video frame from the buffer each time a new video frame is added, wherein a difference between time for fetching adjacent video frames stored in the buffer is less than a preset interval.

19. A non-transitory computer-readable storage medium, comprising instructions, wherein when the instructions are run on an electronic device, the electronic device is enabled to perform operations comprising:

performing optical character recognition (OCR) detection on a first video frame to obtain frame points comprising at least a first initial frame point set, wherein the first initial frame point set comprises frame points that are recognized through the OCR detection and that are used to anchor a location of a first text line, the first text line is any text line in the first video frame, and a quantity of frame points in the first initial frame point set is not less than 4;

determining a first extended frame point set based on the first initial frame point set, wherein the first extended frame point set frames the first text line in N contiguous and equal-width sub-regions, and N is a positive integer not less than 2;

determining, in a second video frame, locations of frame points in the first extended frame point set based on locations of tracing points in a second tracing point set relative to locations of tracing points in a first tracing point set, to obtain a second calculated frame point set, wherein the first tracing point set comprises tracing points in the sub-regions determined based on the first extended frame point set in the first video frame, the second tracing point set comprises tracing points that are predicted in the second video frame and that are at locations corresponding to the locations of the tracing points in the first tracing point set, and the second video frame is a video frame obtained after the first video frame; and determining a second region based on the second calculated frame point set, wherein the second region is a determined location at which the first text line is located in the second video frame.

* * * * *